US006555216B2

(12) United States Patent
Chen et al.

(10) Patent No.: US 6,555,216 B2
(45) Date of Patent: Apr. 29, 2003

(54) CONTRASTING GLOSS SURFACE COVERINGS OPTIONALLY CONTAINING DISPERSED WEAR-RESISTANT PARTICLES AND METHODS OF MAKING THE SAME

(75) Inventors: Hao A. Chen, Chadds Ford, PA (US); Richard Judd; Isaac B. Rufus, both of Newark, DE (US); Jeffrey R. Shultz, Wilmington, DE (US)

(73) Assignee: Mannington Mill, Inc., Salem, NJ (US)

( * ) Notice: Subject to any disclaimer, the term of this patent is extended or adjusted under 35 U.S.C. 154(b) by 0 days.

(21) Appl. No.: 09/752,743

(22) Filed: Dec. 29, 2000

(65) Prior Publication Data

US 2001/0028945 A1 Oct. 11, 2001

Related U.S. Application Data

(63) Continuation of application No. 09/124,221, filed on Jul. 29, 1998, now Pat. No. 6,228,463, which is a continuation-in-part of application No. 09/014,912, filed on Jan. 28, 1998, now Pat. No. 6,218,001, and a continuation-in-part of application No. 08/996,701, filed on Dec. 23, 1997, now Pat. No. 5,961,903, and a continuation-in-part of application No. 08/956,022, filed on Oct. 22, 1997, now Pat. No. 6,291,078
(60) Provisional application No. 60/039,534, filed on Feb. 20, 1997.

(51) Int. Cl.$^7$ .................................................. B32B 3/26
(52) U.S. Cl. .................... 428/322.7; 428/323; 428/328; 428/331
(58) Field of Search .................... 428/160, 161, 428/158, 172, 315.9, 423.1, 173, 334, 335, 302.2, 323, 314, 315, 373, 318.9, 322.7, 331

(56) References Cited

U.S. PATENT DOCUMENTS

| 2,920,977 A | 1/1960 | Adams | 117/15 |
| 3,259,515 A | 7/1966 | Pecker | 117/15 |
| 3,293,094 A | 12/1966 | Nairn et al. | 156/79 |
| 3,293,108 A | 12/1966 | Nairn et al. | 161/160 |
| 3,365,353 A | 1/1968 | Witman | 161/116 |
| 3,458,337 A | 7/1969 | Rugg | 117/15 |

(List continued on next page.)

FOREIGN PATENT DOCUMENTS

| CA | 1010814 | 5/1977 |
| CA | 1011638 | 6/1977 |
| CA | 1013707 | 7/1977 |

(List continued on next page.)

OTHER PUBLICATIONS

King Industries Product Data Sheet for Disparlon® 6500.
BYK Chemie Material Safety Data Sheet for Anti–Terra 205.
BYK Chemie Material Safety Data Sheet for Anti–Terra 204.

(List continued on next page.)

Primary Examiner—Merrick Dixon
(74) Attorney, Agent, or Firm—Kilyk & Bowersox, P.L.L.C.

(57) ABSTRACT

A surface covering containing at least one layer containing wear-resistant particles, such as aluminum oxide, is disclosed. Preferably, the wear-resistant particles are present in the outermost layer of the surface covering which is exposed to the environment. A method to improve wear and/or stain resistance to a surface covering is also disclosed and includes adding an effective amount of wear-resistant particles to a top coat layer or outermost layer of a surface covering optionally, with the use of a suspension aid. Also, layers of surface coverings having differences in gloss levels is also disclosed. Methods of making the surface covering are also disclosed.

14 Claims, 10 Drawing Sheets

U.S. PATENT DOCUMENTS

| | | | | |
|---|---|---|---|---|
| 3,655,312 | A | 4/1972 | Erb et al. | 425/115 |
| 3,660,187 | A | 5/1972 | Shortway et al. | |
| 3,726,952 | A | 4/1973 | Boden et al. | 264/48 |
| 3,773,545 | A | 11/1973 | Erb et al. | 117/64 R |
| 3,787,229 | A | 1/1974 | Rudness | 117/132 BE |
| 3,804,657 | A | 4/1974 | Eyman et al. | 117/11 |
| 3,844,814 | A | 10/1974 | Bettoli et al. | 117/11 |
| 3,870,591 | A | 3/1975 | Witman | 161/119 |
| 3,887,678 | A | 6/1975 | Lewicki, Jr. | 264/284 |
| 3,905,849 | A | 9/1975 | Bomborie | 156/79 |
| 3,914,485 | A | 10/1975 | Curtis | 428/71 |
| 3,916,046 | A | 10/1975 | Youngberg | 428/31 |
| 3,918,393 | A | 11/1975 | Hahn | 427/38 |
| 3,931,429 | A | 1/1976 | Austin | 428/158 |
| 3,953,218 | A | 4/1976 | Pollard | 106/19 |
| 3,953,622 | A | 4/1976 | Wismer et al. | 427/54 |
| 3,953,639 | A | 4/1976 | Lewicki, Jr. | 428/160 |
| 3,962,507 | A | 6/1976 | McCreary et al. | 428/159 |
| 3,978,258 | A | 8/1976 | Faust et al. | 428/159 |
| 4,005,239 | A | 1/1977 | Davis et al. | 428/315 |
| 4,013,598 | A | 3/1977 | Evans et al. | 428/413 |
| 4,016,130 | A | 4/1977 | Antczak | 260/37 N |
| 4,017,493 | A | 4/1977 | Ferment et al. | 427/257 |
| 4,017,658 | A | 4/1977 | Bomboire | 428/172 |
| 4,022,643 | A | 5/1977 | Clark | 156/78 |
| 4,048,036 | A | 9/1977 | Prucnal | 204/159 |
| 4,068,030 | A | 1/1978 | Witman | 428/159 |
| 4,089,731 | A | 5/1978 | Lewicki, Jr. | 156/555 |
| 4,122,225 | A | 10/1978 | Holmstrome et al. | 428/172 |
| 4,137,357 | A | 1/1979 | Emmons | 428/245 |
| 4,142,849 | A | 3/1979 | Lewicki, Jr. et al. | 425/385 |
| 4,170,663 | A | 10/1979 | Hahn et al. | 427/44 |
| 4,172,169 | A | 10/1979 | Mawson et al. | 428/159 |
| 4,187,338 | A | 2/1980 | Miura | 428/159 |
| 4,196,243 | A | 4/1980 | Sachs et al. | 428/147 |
| 4,210,693 | A | 7/1980 | Regan et al. | 428/152 |
| 4,214,028 | A | 7/1980 | Shortway et al. | 428/159 |
| 4,216,267 | A | 8/1980 | Lorenz et al. | 428/412 |
| 4,230,759 | A | 10/1980 | Kauffman et al. | 428/159 |
| 4,241,125 | A | 12/1980 | Canning et al. | 428/158 |
| 4,263,366 | A | 4/1981 | Lorenz et al. | 428/332 |
| 4,273,819 | A | 6/1981 | Schmidle et al. | 428/159 |
| 4,278,483 | A | 7/1981 | Mansolillo | 156/79 |
| 4,298,646 | A | 11/1981 | Haemer et al. | 428/159 |
| 4,301,209 | A | 11/1981 | Lorenz et al. | 428/339 |
| 4,303,695 | A | 12/1981 | McCann et al. | 427/44 |
| 4,310,370 | A | 1/1982 | Arai et al. | 156/220 |
| 4,314,924 | A | 2/1982 | Haubennestel et al. | 260/30.6 |
| 4,348,447 | A | 9/1982 | Miller, Jr. et al. | 428/159 |
| 4,363,271 | A | 12/1982 | Horst | 101/181 |
| 4,379,553 | A | 4/1983 | Kelly | 273/51 |
| 4,390,580 | A | 6/1983 | Donovan et al. | 428/68 |
| 4,395,459 | A | 7/1983 | Herschdorfer et al. | 428/391 |
| 4,409,280 | A | 10/1983 | Wiley et al. | |
| 4,411,931 | A | 10/1983 | Duong | 427/54.1 |
| 4,417,008 | A | 11/1983 | Salensky et al. | 523/442 |
| 4,418,109 | A | 11/1983 | Miller, Jr. et al. | 428/142 |
| 4,443,577 | A | 4/1984 | Higgins et al. | 524/590 |
| 4,450,194 | A | 5/1984 | Kauffman et al. | 428/172 |
| 4,451,605 | A | 5/1984 | Theodore | 524/423 |
| 4,456,643 | A | 6/1984 | Colyer | 428/156 |
| 4,464,423 | A | 8/1984 | LaBinaca et al. | 427/244 |
| 4,491,616 | A | 1/1985 | Schmidle et al. | 428/158 |
| 4,501,790 | A | 2/1985 | Aizawa et al. | 428/283 |
| 4,520,062 | A | 5/1985 | Ungar et al. | 428/148 |
| 4,526,823 | A | 7/1985 | Farrell et al. | 428/35 |
| 4,528,231 | A | 7/1985 | Lund | 428/148 |
| 4,529,650 | A | 7/1985 | Martinez | 428/336 |
| 4,530,856 | A | 7/1985 | Kauffman et al. | 427/197 |
| 4,547,245 | A | 10/1985 | Colyer | 156/220 |
| RE32,152 | E | 5/1986 | Scher et al. | 428/148 |
| 4,588,545 | A | 5/1986 | Kauffman et al. | 264/46.4 |
| 4,595,621 | A | 6/1986 | Valenti et al. | 428/159 |
| 4,647,647 | A | 3/1987 | Haubennestel et al. | 528/83 |
| 4,650,819 | A | 3/1987 | Nakamoto et al. | 523/223 |
| 4,689,102 | A | 8/1987 | Prawdzik et al. | 156/235 |
| 4,698,258 | A | 10/1987 | Harkins, Jr. | 428/285 |
| 4,747,901 | A | 5/1988 | Becker et al. | 156/220 |
| 4,756,951 | A | 7/1988 | Wang et al. | 428/204 |
| 4,762,752 | A | 8/1988 | Haubennestel et al. | 428/407 |
| 4,795,796 | A | 1/1989 | Haubennestel et al. | 528/28 |
| 4,816,314 | A | 3/1989 | Prawdzik et al. | 156/235 |
| 4,857,111 | A | 8/1989 | Haubennestel et al. | 106/504 |
| 4,863,782 | A | 9/1989 | Wang et al. | 428/204 |
| 4,869,954 | A | 9/1989 | Squitieri | 428/283 |
| 4,871,596 | A | 10/1989 | Kamiya et al. | 428/15 |
| 5,049,433 | A | 9/1991 | Leotta | 428/195 |
| 5,077,112 | A | 12/1991 | Hensel et al. | 428/76 |
| 5,091,258 | A | 2/1992 | Moran | 428/437 |
| 5,112,671 | A | 5/1992 | Diamond et al. | 428/156 |
| 5,151,218 | A | 9/1992 | Haubennestel et al. | 252/351 |
| 5,167,705 | A | 12/1992 | Coughlan | 106/36 |
| 5,169,435 | A | 12/1992 | Sherman et al. | 106/20 |
| 5,188,876 | A | 2/1993 | Hensel et al. | 428/76 |
| 5,254,395 | A | 10/1993 | Hodnett, III | 428/217 |
| 5,256,465 | A | 10/1993 | Martin et al. | 428/158 |
| 5,258,225 | A | 11/1993 | Katsamberis | 428/331 |
| 5,278,223 | A | 1/1994 | Gruenewaelder et al. | 524/502 |
| 5,336,693 | A | 8/1994 | Frisch | 521/72 |
| 5,338,504 | A | 8/1994 | Wang et al. | 264/555 |
| 5,344,704 | A | 9/1994 | O'Dell et al. | 428/323 |
| 5,360,914 | A | 11/1994 | Inoue et al. | 548/546 |
| 5,395,673 | A | 3/1995 | Hunt | 428/148 |
| 5,397,406 | A | 3/1995 | Vaders et al. | 156/64 |
| 5,405,674 | A | 4/1995 | Wang et al. | 428/158 |
| 5,425,986 | A | 6/1995 | Guyette | 428/283 |
| 5,439,969 | A | 8/1995 | Sanduja et al. | 524/534 |
| 5,458,953 | A | 10/1995 | Wang et al. | 428/195 |
| 5,478,878 | A | 12/1995 | Nagaoka et al. | 524/430 |
| 5,487,939 | A | 1/1996 | Phillips et al. | 428/334 |
| 5,494,707 | A | 2/1996 | Wang et al. | 427/412.1 |
| 5,500,253 | A | 3/1996 | Sanduja et al. | 427/385.5 |
| 5,505,808 | A | 4/1996 | Hallman et al. | 156/233 |
| 5,554,671 | A | 9/1996 | Cuaun et al. | 523/408 |
| 5,578,548 | A | 11/1996 | Bjork et al. | 503/202 |
| 5,643,677 | A | 7/1997 | Fiefer et al. | 428/424.6 |
| 5,670,237 | A | 9/1997 | Shultz et al. | 428/173 |
| 5,679,721 | A | 10/1997 | Courtoy et al. | 522/95 |
| 5,733,644 | A | 3/1998 | Tanaka et al. | 428/215 |
| 5,763,048 | A | 6/1998 | Takahashi | 428/147 |
| 5,800,904 | A | 9/1998 | Hallman et al. | 428/156 |
| 5,817,402 | A | 10/1998 | Miyake et al. | 428/159 |
| 5,830,937 | A | 11/1998 | Shalov et al. | 524/297 |
| 5,843,576 | A | 12/1998 | Rosenberry et al. | 428/423.1 |
| 5,858,160 | A | 1/1999 | Piacente et al. | 156/279 |
| 5,876,551 | A | 3/1999 | Jackson | 156/307 |
| 5,891,564 | A | 4/1999 | Schultz et al. | 428/324 |
| 5,902,663 | A | 5/1999 | Justesen et al. | 428/95 |
| 5,910,358 | A | 6/1999 | Thoen et al. | 428/95 |
| 5,928,778 | A | 7/1999 | Takahashi et al. | 428/323 |
| RE36,359 | E | 10/1999 | Ebashi et al. | 530/350 |
| 5,961,903 | A | 10/1999 | Eby et al. | 264/46.5 |
| 6,008,462 | A | 12/1999 | Soltwedel | 219/91.2 |
| 6,022,919 | A | 2/2000 | Komoto et al. | 524/430 |
| 6,040,044 | A | 3/2000 | Takahashi et al. | 428/323 |
| 6,080,474 | A | 6/2000 | Oakley et al. | 428/323 |

FOREIGN PATENT DOCUMENTS

| | | |
|---|---|---|
| CA | 1016890 | 9/1977 |
| DE | 1237244 | 2/1968 |
| DE | 43 04 491 A1 | 8/1994 |

| | | |
|---|---|---|
| DE | 198 02 982 A1 | 8/1999 |
| DE | 198 45 496 A1 | 4/2000 |
| EP | 0 003 965 A1 | 9/1979 |
| EP | 0 075 646 A1 | 2/1985 |
| EP | 0 139 187 A1 | 5/1985 |
| EP | 0 768 351 A1 | 4/1996 |
| EP | 0 943 664 A2 | 3/1999 |
| GB | 1 383 024 | 3/1974 |
| GB | 1 588 972 | 5/1981 |
| JP | 61-20422 | 1/1986 |
| JP | 363009533 A | 1/1988 |
| JP | 63-189441 | 8/1988 |
| JP | 1 (1989) 110123 | 4/1989 |
| JP | 62 (1987) 267711 | 4/1989 |
| JP | 402270537 A | 11/1990 |
| JP | Hei7-54302 | 3/1995 |
| JP | 8-244060 | 9/1996 |
| JP | 10183059 | 12/1996 |
| WO | WO 84/00719 A1 | 3/1984 |
| WO | WO 94/01406 | 1/1994 |
| WO | WO 00/52105 | 9/2000 |

OTHER PUBLICATIONS

BYK Chemie Material Safety Data Sheet for Anti–Terra–P.
King Industries—Product Data Sheet for Disparlon® 6500.
BYK Chemie, Product Information, Wetting and Dispersing Additives in the Coatings Industry pp. 1–20.
Stork X–Cel, "The Stork X–cel Coating–Intercover Technical Center" brochure, date not available.
Domco industries Limited, "AquaFlo IIr" brochure.
International Search Report for PCT/US 98/27264, mailed Aug. 31, 1999.
English Language Abstract for Japanese Appl. JP 85050584 (Nov. 09, 1985).
English Language Abstract for Japanese Appl. JP 75034082 (Nov. 06, 1975).
English Language Abstract for Japanese Appl. JP 85004307 (Feb. 02, 1985).
TOLI Cushion Floor Brochure (CF–P Sheet) pp. 1–52 (1994–1995).

CONTRASTING GLOSS SURFACE COVERINGS OPTIONALLY CONTAINING DISPERSED WEAR-RESISTANT PARTICLES AND METHODS OF MAKING THE SAME

This application is a continuation of U.S. application Ser. No. 09/124,221, filed Jul. 29, 1998, now U.S. Pat. No. 6,228,463, which is a continuation-in-part of U.S. patent application Ser. No. 08/956,022, now U.S. Pat. No. 6,291,078, entitled "Surface Coverings Containing Aluminum Oxide," filed Oct. 22, 1997, and U.S. patent application Ser. No. 09/014,912 now U.S. Pat. No. 6,218,001, entitled "Surface Coverings Containing Dispersed Wear-Resistant Particles and Methods of Making the Same" filed Jan. 28, 1998; and U.S. Patent Application Nos. 60/039,534 entitled "Surface Coverings Having a Natural Appearance and Methods to Make a Surface Covering Having a Natural Appearance" filed Feb. 20, 1997, and Ser. No. 08/996,701 now U.S. Pat. No. 5,961,903, filed Dec. 23, 1997, which are all incorporated in their entirety herein by reference.

BACKGROUND OF THE INVENTION

The present invention relates to surface coverings, such as resilient floor coverings or wallpaper, and further relates to methods of preparing the same. The present invention also relates to methods to improve wear and/or stain resistance of surface coverings. The present invention also relates to surface coverings, such as surface coverings having a natural appearance, and optionally having a difference in gloss between two or more layers. The present invention further relates to methods of making these types of surface coverings.

Present surface coverings, such as resilient flooring, can contain a resilient support surface, a wear surface, and a wear layer top coat. The top coat, in situations where the surface covering is a resilient floor, is subjected to foot traffic and wear from carts and other heavy objects coming in contact with the wear layer top coat. As a result, the top coat deteriorates leading to the exposure of lower layers of the resilient floor such as the wear layer base coat, a print layer or even the resilient support surface. When the lower layers are exposed and subjected to the environment including foot traffic and other objects, the resilient floor becomes unsightly (e.g., dirty, difficult to clean and susceptible to stains) and can also be partially or completely destroyed.

While efforts have been made to create more resilient surface coverings, especially in the flooring industry, such efforts have not totally solved the problem of making the wear top coat more resilient to the environment it is subjected to. Efforts to make the top coat more resilient have included radiation curable urethane topcoats, waterbase urethane, acrylic, or melamine coatings and the like. However, none of these efforts have proven totally satisfactory. Accordingly, there is a need for an improved surface covering which is more resilient to wear and staining. Also, there is a need for surface coverings having a realistic, natural "look" or appearance of wood, stone, marble, granite, or brick which are more resilient to wear and staining, and methods of making the same.

SUMMARY OF THE INVENTION

Accordingly, a feature of the present invention is to provide a surface covering which has improved wear and/or stain resistance.

Another feature of the present invention is to provide a surface covering having a design, such as, for example natural wood, stone, marble, granite, or brick appearance which is realistic in appearance and yet has improved wear and/or stain resistance. A further feature of the present invention is to provide a method of making such a surface covering.

Also, a feature of the present invention is to provide a surface covering having contrasting gloss between two or more layers. Additional features and advantages of the present invention will be set forth in part in the description which follows, and in part will be apparent from the description, or may be learned by practice of the present invention. The objectives and other advantages of the present invention will be realized and attained by means of the elements and combinations particularly pointed out in the written description including the drawing and appended claims.

To achieve these and other advantages and in accordance with the purpose of the present invention, as embodied and broadly described herein, the present invention relates to a surface covering comprising at least one layer which contains wear-resistant particles, like aluminum oxide, dispersed therein. Preferably, the wear-resistant particles are present as part of at least one of the outermost layers or top coat layer.

The present invention further relates to a method to improve wear and/or stain resistance to a surface covering. This method includes the steps of adding an effective amount of wear-resistant particles, like aluminum oxide, to at least one layer, such as one of the outermost layers or a top coat layer, or to a formulation which is used to form at least one layer, such as one of the outermost layers or a top coat layer, with the use of a suspension aid preferably comprising silica, a polyamine amide, a polyamide, or an unsaturated polycarboxylic acid.

In addition, the present invention relates to a method of making a surface covering which includes the steps of forming a layer comprising wear-resistant particles, like aluminum oxide. Preferably, this layer is a top coat layer or at least one of the outermost layers.

The present invention also relates to a surface covering having a backing layer and a foam layer located on top of the backing layer. Further, a design layer having a design is located on top of the foam layer. Part of the design on the design layer may contain a foaming inhibitor (i.e., chemically embossed). A wear layer, located on top of the design layer, is mechanically embossed with a surface texture when the wear layer is in a softened state. The foam layer may or may not be mechanically embossed. Finally, at least one top coat layer is located on top of the wear layer, wherein the top coat layer comprises a cured resin; a suspension aid preferably comprising a polyamine amide, a polyamide, or an unsaturated polycarboxylic acid; and wear-resistant particles dispersed throughout the layer.

The present invention further relates to a surface covering having a natural wood, stone, marble, granite, or brick appearance. This surface covering has a backing layer, a foam layer located on top of the backing layer, and a design layer. The design layer has a design of wood, stone, marble, granite, or brick. This design layer is located on top of the foam layer and the design has chemically embossed joint or grout lines, which simulate such features found in natural surfaces where wood, stone, marble, granite, or brick are formed as surfaces for floors, for example. In addition, a continuous wear layer, located on top of the design layer, is mechanically embossed with a surface texture of natural wood; stone, marble, granite, or brick after the wear layer has been softened. The foam layer may or may not be mechanically embossed. Finally, a non-continuous top coat is located on top of the embossed wear layer but only overlying the non-chemically embossed areas. The continuous wear layer and non-continuous top coat layer can have a difference in gloss to obtain a contrasting effect. In the alternative, a continuous top coat layer can be located on top of the wear layer and a non-continuous top coat layer can be located on top of the continuous top coat layer. One or both of the top coat layers and/or the wear layer can contain wear resistant particles and the suspension aid.

The present invention also relates to a method for making a surface covering, preferably having a natural wood, stone, marble, granite, or brick appearance. The method includes the steps of providing a surface covering having a backing layer, a foamable layer located on top of the backing layer, and a design layer located on top of the foamable layer. The design layer preferably has a design of wood, stone, marble, granite, or brick. A portion of the design in the design layer is printed with a retarder composition. In the preferred embodiment, the design that is printed with the retarder composition is joint or grout lines. A continuous wear layer is then provided on top of the design layer and subjected to curing to cure the wear layer and expand the foamable layer, thus chemically embossing areas which have been printed with the retarder composition. For purposes of the present invention, "curing" is also known in the art as "fusing." This product is then subjected to a sufficient temperature to soften the cured wear layer. After it has been softened, the wear layer is mechanically embossed while it is the softened state. In particular, the wear layer is mechanically embossed with a surface texture, for example, of wood, stone, marble, granite, or brick and the foam layer may or may not be mechanically embossed depending on the embossed design and the pressure applied to the wear layer. Finally, a non-continuous top coat layer is provided on top of the embossed wear layer only overlying the non-chemically embossed areas. The continuous wear layer and the non-continuous top coat layer can have a difference in gloss to create a contrasting effect. Alternatively, a continuous top coat layer is provided on top of the wear layer and a non-continuous top coat layer is located on top of the continuous top coat layer but only overlying the non-chemically embossed areas. The continuous top coat layer and non-continuous top coat layer can have a difference in gloss as well.

It is to be understood that both the foregoing general description and the following detailed description are exemplary and explanatory only and are intended to provide further explanation of the present invention, as claimed.

DETAILED DESCRIPTION OF THE PRESENT INVENTION

Figure 1:
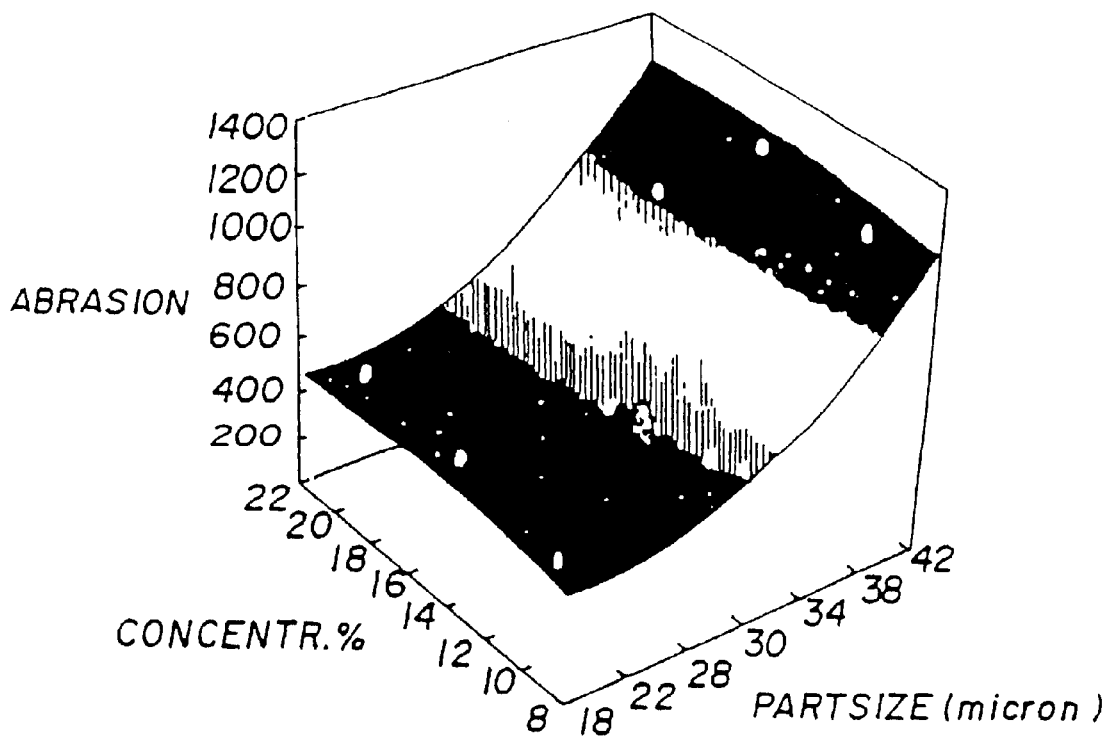
FIG. 1 is a graph showing the relationship between particle size of $Al_2O_3$ and concentration and abrasion resistance.
Figure 2:
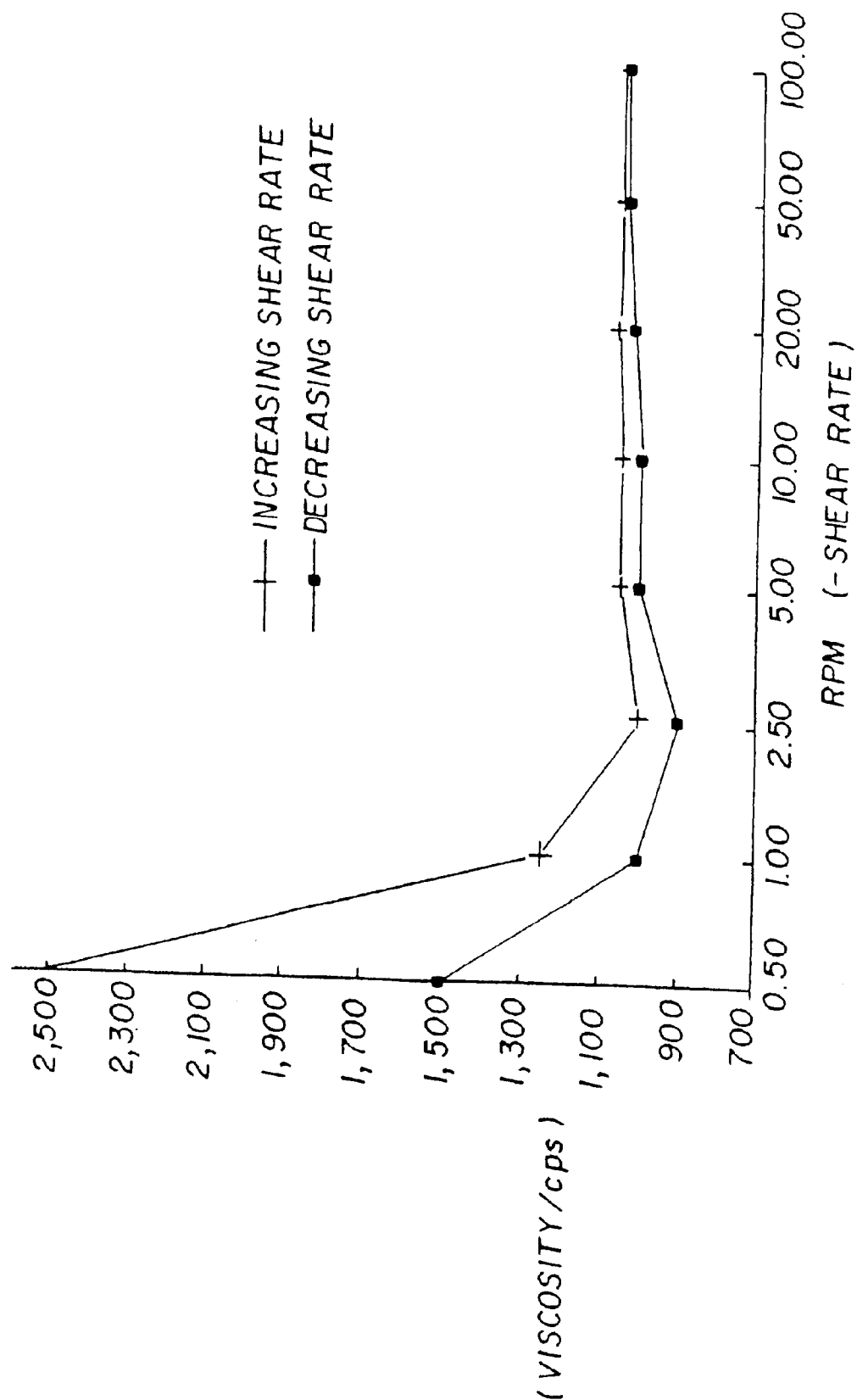
FIGS. 2–6 are graphs showing the relationship between viscosity and shear rate of several coating formulations.
Figure 3:
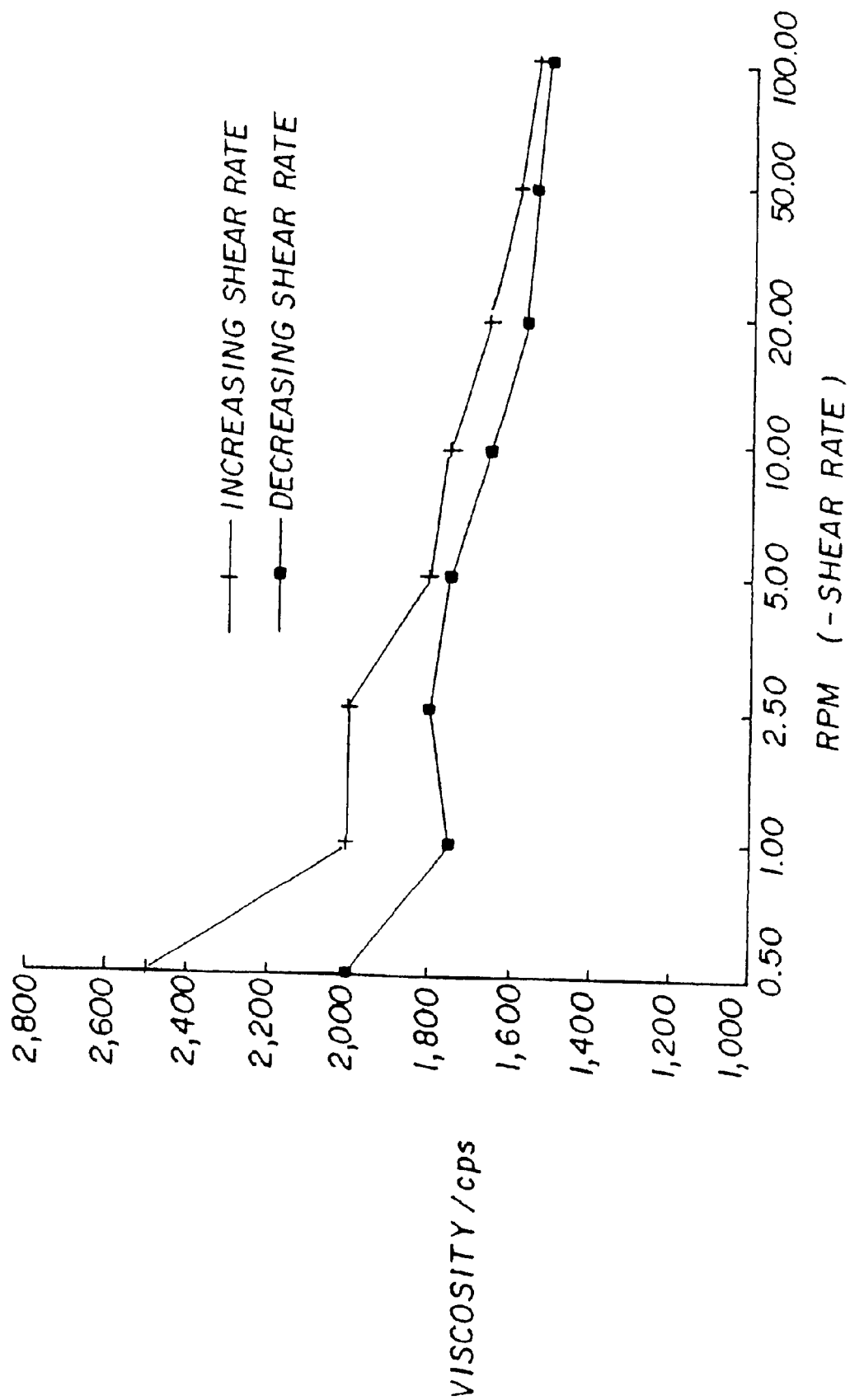
Figure 4:
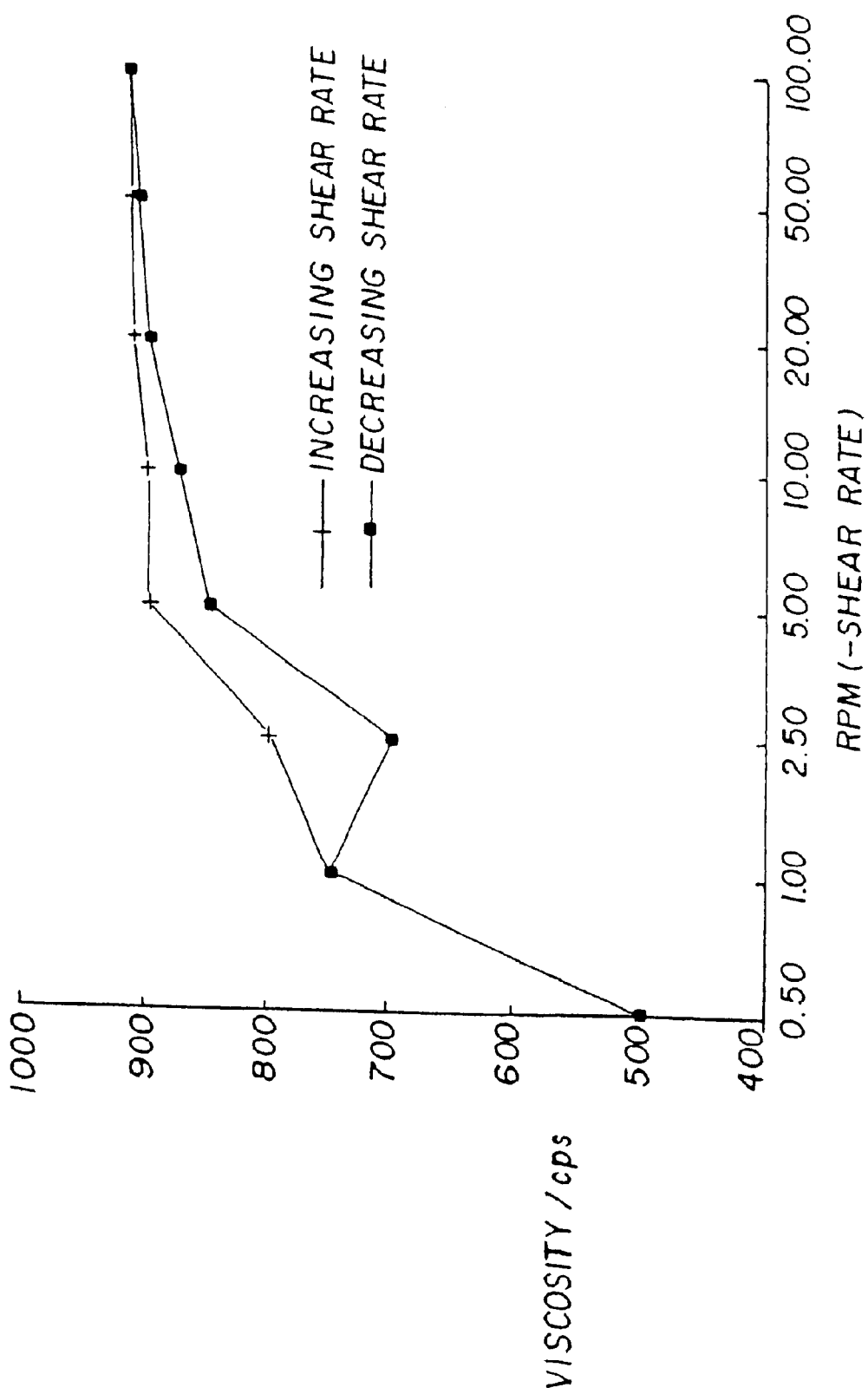
Figure 5:
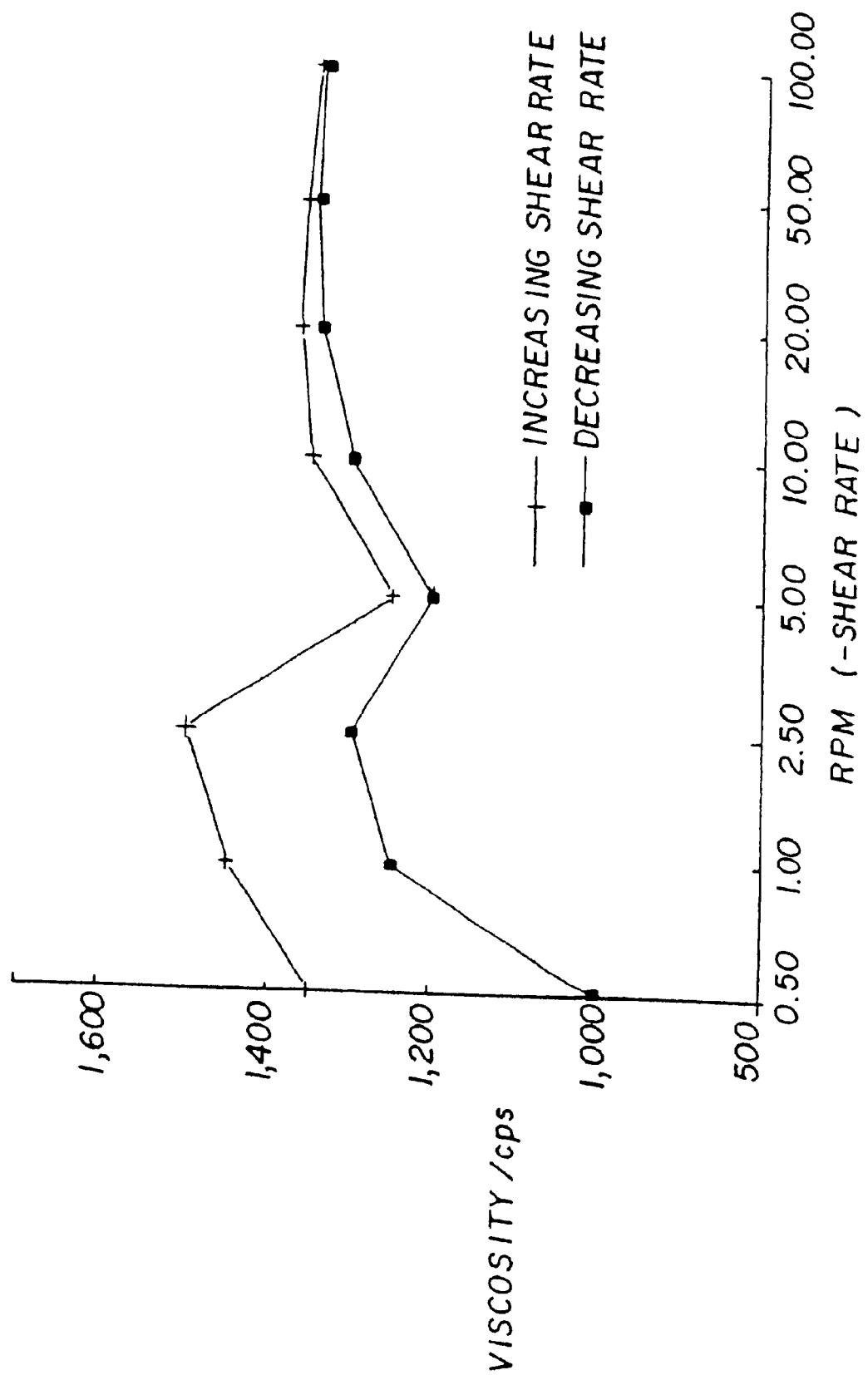
Figure 6:
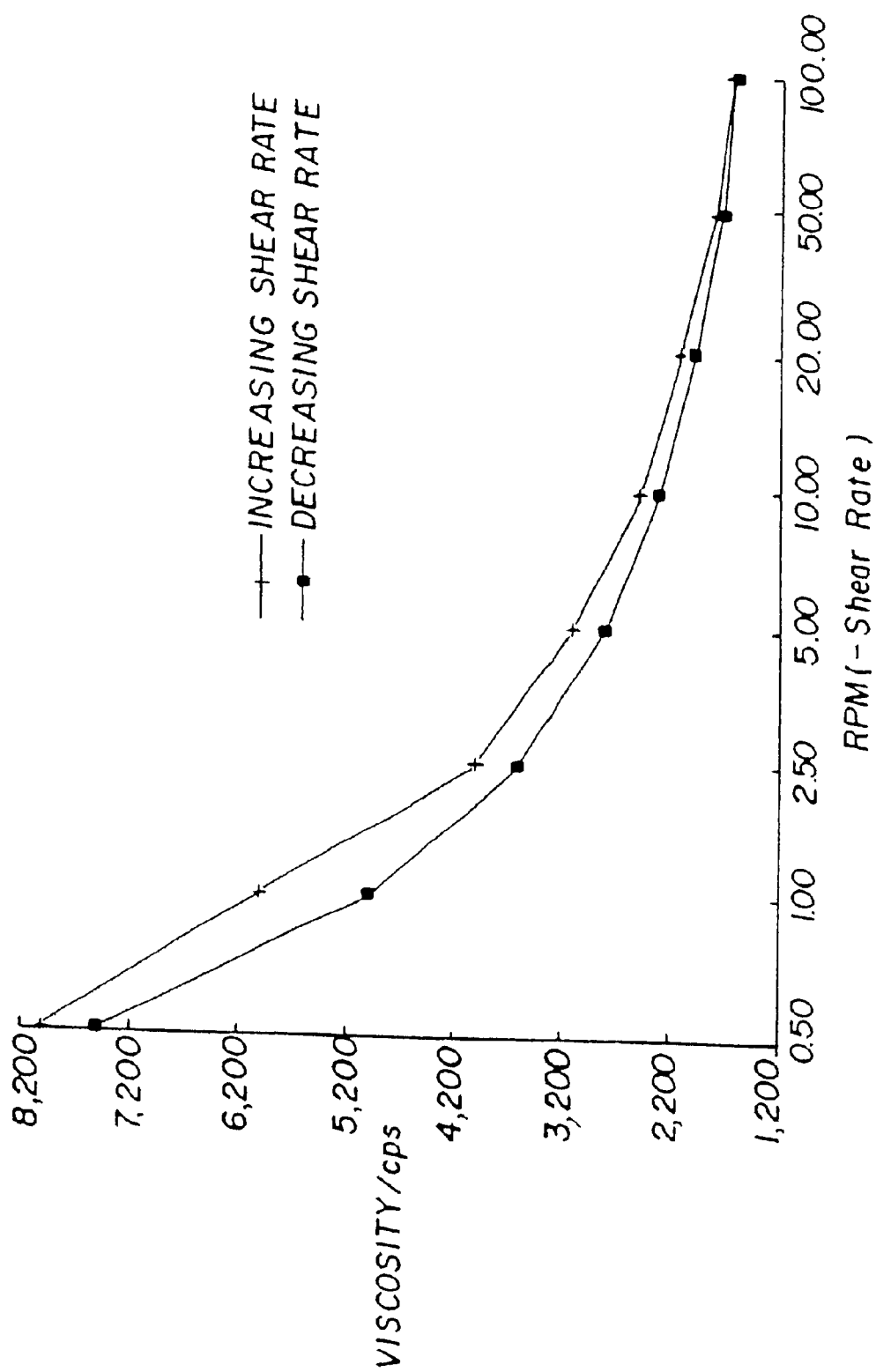

The present invention relates to a surface covering comprising at least one layer containing wear-resistant particles, like, aluminum oxide. Surface covering includes, but is not limited to, flooring, wall paper, countertops, automobile dash boards, automotive coatings, and the like. Particularly, preferred surface coverings are tiles, resilient flooring, slip-resistant flooring, and the like.

The aluminum oxide that can be used in the present invention is also known as alumina or $Al_2O_3$. Preferably, the aluminum oxide is fused or calcined. The refractive index is preferably from about 1.4 to 1.7. Other wear-resistant particles include, but are not limited to, carborundum, quartz, silica (sand), glass particles, glass beads, glass spheres (hollow and/or filled), plastic grits, silicon carbide, diamond dust (glass), hard plastics, reinforced polymers, organics, and the like, and may be substituted for all or part of the alumina.

Also, while any source of aluminum oxide can be used, it is preferred that the aluminum oxide have the following characteristics: fused or calcined and having a hardness of from about 6 to 9 on a Moh's scale, and most preferably about 9 on a Moh's scale. Preferably, the particle size of the wear-resistant particles is from about 10 microns to about 350 microns, and more preferably from about 20 microns to about 250 microns, and most preferably from about 30 microns to 200 microns. Sources for preferred aluminum oxide are Washington Mills, N. Grafton, Mass.; ALCOA Industrial Chemicals, Bauxite, Ark.; Composition Materials, Fairfield, Conn.; Micro Abrasives, Westfield, Mass.; and Alu Chem, Inc. Birmingham, Ala.

Generally, a sufficient amount of the wear-resistant particles are present in at least one layer of the surface covering to provide improved wear and/or stain resistance to a surface covering as compared to no wear-resistant particles being present. Wear resistance can be determined by a Taber abrasion test, a Gardener Scrubber test, a walk test, and the like. The Taber abrasion test is more commonly used in the flooring industry. One way to determine stain resistance is by staining the sample with different stain substances and removing the stain after about 1 to 5 hours with solvents. The stain remaining on the sample is rated on a scale from 0 to 3, where 0 means no stain showing and 3 means the darkest, visible stain showing.

Preferably, from about 2 $g/m^2$ to about 50 $g/m^2$, and more preferably from about 4 $g/m^2$ to about 20 $g/m^2$ of wear-resistant particles are present in at least one layer of the surface covering. Alternatively from about 1% by weight to about 75% by weight of wear-resistant particles are present in a layer of the surface covering, more preferably, from about 5% to about 50% by weight based on the weight of the layer.

The wear-resistant particles, which are part of at least one layer of the surface covering, can be added in any manner known to those skilled in the art for adding particles to a layer. The wear-resistant particles can be mixed into a wet coating or scattered on top of a wet coating. For instance, the wear-resistant particles can be applied by a pellet dispenser which applies or sprinkles the particles on top of a layer which is still "wet" or uncured. By the layer being "wet" or uncured, the wear-resistant particles "stick" or adhere to the "wet" layer and at least a portion of the particles "sink" into the layer and thus are not exposed to the environment.

Several types of scattering machines can be used to accomplish the uniform sprinkling or dispensing of alumina or other hard particles. Normally the scattering machine has a rotating or applicator roll (engraved or knurled) at the bottom of the hopper. A stationary or rotary brush is used to remove particles from the dispensing or applicator roll. A shaker screen may be used under the hopper for uniform distribution of aluminum oxide or other hard particles. The knurl size, the dispensing or applicator roll speed, the brush position, the speed of the rotary brush, and the speed and the size of the shaker screen should all be selected based on the amount and the size of the wear-resistant particles to be used.

For example, to obtain a smooth-looking product, the coating thickness should be just sufficient to cover the wear-resistant particles when scattered on the wet coating. The other way to accomplish this is to use a multi-layer coat system. In this case, the particles are uniformly scattered on a wet coat, and then after a partial, full, or no cure, a second coat is applied on top of the initial coat with or without wear-resistant particles in the second coat. For a smooth coating, the total thickness of the coating (different layers) should be greater than the largest particle size used. There are several combinations of this type of construction. For example, a construction can be used where the wear-resistant particles are placed at different locations in a coating, such as the top coat (see Tables 3 and 6). Another construction would be to sandwich the wear-resistant particles between two layers of coating. If this construction is used, the particle can anchor the first layer with the second layer. In this type of construction, the curing process is precisely controlled to have intercoat adhesion and other desired properties of the finished product.

In still another type of construction, the coating thickness and the particles size of the wear-resistant particles are chosen in a way that a desired portion of the particles sinks into the coating and the other part is exposed above the top coat. This gives the product very high wear resistance because the protruding particles offer high wear resistance.

The scattering of the wear-resistant particles are preferably be very uniform and precise. In a typical application, the particles are dispensed by industrial or lab scale dispensing machines such as the Christy Machine (Ohio, U.S.A.) or the Emil Paul Schilling AG Scattering Machine (Germany, Switzerland). Application of the particles by scattering machines gives several advantages over conventional methods of mixing and other techniques.

For instance, solid vinyl (inlaid) coverings are preferably coated with 1.0–1.8 mil of acrylated urethane based UV-curable top coat. On the wet coat (in a typical application), from about 5 to about 15 g/m$^2$ of wear-resistant particles, like fused alumina with average particle size in the range of from about 25 to about 40 microns are applied to this top coat by a modified Christy Machine or by a Schilling scattering machine and then the top coat is cured by UV-light employing either a direct or differential cure mechanism. Depending on the product specification, the amount of wear-resistant particles and the thickness of the coating can be varied. For example, from about 15 to about 35 g/m$^2$ of wear-resistant particles (in a layer) in the particle size range of from about 50 to about 150 microns could be used in the production of non-slip coverings.

The size and the concentration of the wear-resistant particles can be optimized based on several properties of the finished products, such as wear resistance, flexibility, stain resistance, gloss, cleanability, appearance, etc. In a typical application, a coating thickness of from about 1.0 to about 1.8 mil with a particle size of from about 25 to about 35 microns can be used at a particle application rate of from about 5 to about 15 grams/m$^2$ of a layer to achieve a smooth look. The particles can sink into a wet coating and thus be covered by the coating. The coating can then be cured to achieve smoothness.

Once the wear-resistant particles are applied to the layer which is "wet" or uncured, the surface covering containing this layer is cured by means known to those skilled in the art, such as radiation curing, UV, electron beam, thermal and/or moisture curing, and the like.

While this "scattering" method, described above, is an effective way to incorporate wear-resistant particles into coating layers, the incorporation of more than 20% by weight wear-resistant particles, based on the weight of the layer, can be difficult due to agglomeration concerns and/or placing such a large amount of wear-resistant particles on top of the "wet" layer. When larger amounts of wear-resistant particles are intended to be included in a layer or when a more uniform distribution of wear-resistant particles throughout the entire thickness of the layer is preferred, then a more preferred embodiment would be to use a formulation to which the wear-resistant particles are added to and subsequently dispersed and maintained in suspension with the aid of a suspension aid.

In order to overcome the potential difficulty of maintaining wear-resistant particles in a coating medium or formulation, a method of incorporating wear-resistant particles, like alumina, and preferably high density wear-resistant particles, into a liquid coating medium or formulation for subsequent storage or cure is also part of the present invention. With the use of the particular formulation of the present invention, the storage and subsequent use of the coating medium or formulation containing the wear-resistant particles is possible without significant settling of the particles or the hard-packing of the wear-resistant particles. Also, higher amounts of wear-resistant particles can be incorporated into the layer without significant settling or agglomeration. Thus, with the present invention, it is possible, and even preferable, to use this formulation to incorporate wear-resistant particles into a liquid coating medium or formulation (prior to curing), such as liquid thermoplastic or thermosetting curable polymers or resins, like urethane-based polymers, urethane-acrylates, and the like.

In particular, a suspension aid is used to prevent the settling of the wear-resistant particles, such as alumina, in the liquid coating medium or formulation. Preferably, the suspension aid is a polymer comprising a polyamine amide, a polyamide, or an unsaturated polycarboxylic acid and more preferably is a high molecular weight version of one of these polymers. More preferably, the suspension aid is a polymer comprising a carboxylate acid salt of a polyamine amide, a phosphoric acid salt of a long chain carboxylic acid polyamine amide or a solution of a partial amide and alkylammonium salt of a higher molecular weight unsaturated polycarboxylic acid and polysiloxane copolymer. Any combinations or mixtures of various suspension aids can be used. Specific examples of such polymers include, but are not limited to, Anti-Terra® polymers from BYK CHEMIE. More preferred are the specific products Anti-Terra®-202, Anti-Terra®-205, Anti-Terra®-204, Anti-Terra®-P, Anti-Terra®-U-80, BYK-P-105, Anti-Terra® U and Lactimon type suspension aids, all available from BYK Chemie. Other specific examples of suspension aids include Disparlon® 6500 polyamide thixotrope from King Industries. Other suitable suspension aids which can be used in the present invention are also described in U.S. Pat. No. 4,795,796 which is incorporated in its entirety herein by reference. Typically, a solvent, such as a non-aqueous solvent is present with the suspension aid, such as butyl acetate, xylene, PMA, methoxy propylacetate, alcohols (such as isubutanol and methoxypropanol) and the like.

Thus, a coating medium or formulation comprises a) wear-resistant particles, such as alumina, b) a suspension aid and c) a curable resin, such as a urethane-based resin or the like. A liquid coating medium or formulation can be made from these ingredients and can be added and/or mixed in any order. Preferably, all other ingredients, including the suspension aid, are added before the introduction of the wear-resistant particles. Further, it is preferred that all other ingredients, except for the wear-resistant particles are first compounded by any means, such as mixing, and then heated to a temperature sufficient to lower the viscosity of the formulation or mixture before introducing the wear-resistant particles.

More preferably, the curable resin is added and compounded and then the suspension aid is added and the mixture subjected to mixing and thereafter the wear-resistant particles are added with further mixing. For instance, if a urethane-based resin is present, the formulation will typically be heated to a temperature of from about 190° F. to about 230° F. to lower the viscosity without causing any curing of the curable resin. Once all of the ingredients have been compounded, except for the wear-resistant particles and the suspension aid, and the temperature of the formulation is at an elevated state, the suspension aid can be added preferably under high shear rates and mixed thoroughly with the other ingredients. Then, this liquid formulation is preferably cooled (such as less than 100° F.) under agitation to a temperature which will increase the viscosity of the entire formulation. When the mixture is cooled, such as to ambient conditions, the wear-resistant particles can then be added under high shear mixing. Then, the liquid coating medium can be stored for subsequent use or can be immediately used in the formation of a coating layer, such as a top coat by means known to those skilled in the art in forming any other type of surface covering layers, such as roll coating and the like.

With high molecular weight suspension aids, heating with mixing is preferred, but such heating is unnecessary with lower molecular weight suspension aids, and mixing can occur at ambient temperatures.

Generally, the suspension aid is present in an amount sufficient to suspend the wear-resistant particles in the liquid coating medium or formulation for a period of time, preferably for at least one week, and more preferably for at least one month, and even more preferably for at least 3 months prior to any curing of the liquid coating medium or formulation. Other preferred periods of time of suspension of the wear-resistant particles include from about 1 week to about 6 months and more preferably from about 2 weeks to about 3 months, and most preferably from about 3 months to about 6 months. Preferably, the suspension aid is present in an amount of from about 0.5% by weight to about 1.25% by weight, and more preferably from about 0.10% by weight to about 1.0% by weight, and most preferably from about 0.20% by weight to about 1.0% by weight, based on the weight of the coating layer containing the suspension aid.

Further, with the use of the suspension aids of the present invention, the viscosity of a coating medium or formulation can be significantly increased during storage. For instance, the viscosity of a coating medium or formulation containing a curable resin, wear-resistant particles, and an effective amount of a suspension aid, can be increased from about 5 times to about 100 times, and more preferably from about 10 times to about 20 times compared to the same coating medium or formulation not having any suspension aid present. This increase in viscosity during storage or during no application of shear assists in maintaining the wear-resistant particles in suspension. Further, with the proper suspension aids in the coating medium or formulation, during shearing (e.g. from about 0.5 to about 100 rpm using a Brookfield [Thermosel] No. 27 spindle), the viscosity can be significantly lowered, such as on the order of 1 to 10 times which is advantageous when mixing the coating medium or formulation or applying the coating medium or formulation by a roll coater or other methods of coating where high shear can be used or other means to form a coating layer for subsequent curing.

When adding the suspension aid to a liquid coating medium, it is preferred that the liquid coating medium be subjected to high shear mixing conditions (e.g. about 700 rpm) until the suspension aid is substantially dispersed amongst the liquid coating medium and then with the introduction of the wear-resistant particles, it is preferred that the mixture be mixed at a higher shear rate, (e.g. such as 800 rpm) while the wear-resistant particles are being added to the liquid coating medium. Thereafter, when all ingredients have been added, it is preferred that the mixing rate of the mixture be significantly increased, such as to about 1800 rpm for about 30 minutes or until the wear-resistant particles are substantially dispersed uniformly in the liquid coating medium.

Preferably, an anti-foaming agent or defoamer is also present in the coating medium or formulation in effective amounts to reduce or prevent any foaming resulting from the high shear rates which are preferably used to introduce the wear-resistant particles into the coating mediums of the present invention.

If the particles are uniformly suspended in the coating at a fixed coating thickness and weight of the wear-resistant particles, the abrasion resistance will increase as the particle size is increased. Similarly, at a given coating thickness and wear-resistant particle size, the abrasion resistance will be governed by the weight or concentration of particles in the coating. Table 6 and FIG. 1 further exemplify this relationship.

The particle size of the wear-resistant particles is generally proportional to the wear resistance of the coating at a constant coating thickness and at a constant loading of the wear-resistant particles. In the same way, at a fixed coating thickness and particle size of the wear-resistant particles, the wear resistance of the cured coating is directly related to the weight of the wear-resistant particles incorporated in the coating.

The particle size of the wear-resistant particles are preferably equal to or higher (preferably from 1060% higher) than the coating thickness in order to achieve high wear resistance. When the hard particles, such as alumina, protrude above the coating, these hard particles protect the coating from abrading. This method gives very high abrasion resistance to the product. However, when the wear-resistant particles are exposed or not covered by the coating, the particles may act as dirt catchers. Thus, depending on the end use of the product, the coating thickness, the particle size, and the amount of wear-resistant particles should be suitably selected.

The coating thickness and the particle size of wear-resistant particles should be selected depending on the required wear characteristics, product appearance, and other properties of the finished product such as stain resistance, flexibility, cleanability, aesthetics, slip resistance, tactile modification, and styling requirements.

Preferably, the wear-resistant particles are present in one of the outermost layers of a surface covering which are the layers subjected to the environment including foot traffic and other objects coming in contact with the surface covering. Generally, these outermost layers are known as the top coat layers or wear layer top coats. Typically, the wear layer top coat is made of a thermoplastic or thermosetting material, such as urethane or acrylic, melamine, polyvinylchloride, polyolefins, and the like. Preferably, the curable layer is a thermosetting urethane-based acrylate. For purposes of the present invention, curable resin encompasses thermoset and thermoplastic resins, including 100% solid-based and water-based resins and includes the resins mentioned above and below.

Acrylics, alkyd resins, melamines, conventional clear coats, polyvinyl chloride, polycarbonates, kevlar, epoxy coatings, polyester, polyester acrylates, vinyl-ether-functionalized urethane, epoxysiloxanes, multifunctional amine terminated acrylates, acrylate melamines, polyethylene and diene copolymers, and the like, can also be used, in place of the urethane based acrylates described above. Basically, the wear resistance of any surface or coating can be improved by the incorporation of wear-resistant particles, such as fused or calcined alumina.

In a preferred embodiment of the present invention, the surface covering is a resilient flooring which contains a resilient support surface. Applied to the top of and adhered to this resilient support surface is a wear surface. The wear surface can contain a wear layer base coat and a wear layer top coat. Also, an initial wear layer can be applied prior to the wear layer base coat which is adhered to the support surface. A strengthening layer can also be present and located anywhere in the resilient surface covering. Preferably, the strengthening layer is present and is in contact with the resilient support surface, The strengthening layer can comprise a vinyl resin and a polymerized, cross-linkable monomer and can even be disposed between two foam layers. The wear layer base coat preferably comprises a flexible, thermosettable, polymer composition. The wear layer top coat preferably comprises thermosettable, UV curable blend of acrylic or acrylate monomers or urethane. Typically, the top coat comprises a urethane layer and this urethane layer will contain the wear-resistant particles.

One preferred design of a surface covering wherein wear-resistant particles can be applied to a layer is described in U.S. Pat. No. 5,458,953, incorporated in its entirety by reference herein. The method of preparing this surface covering can also be used in the present invention with the additional step of adding the wear-resistant particles to one layer incorporated into this method.

Besides the above-described embodiments for incorporating wear-resistant particles into a coating layer, another method of incorporating wear-resistant particles into one or more coating layers involves the use of fumed silica or alumina or other similar types of materials as the suspension aid which have a submicron particle size range. Preferably, the submicron particle size range is from 5 to about 25 nm. Preferably, from about 0.10 to about 2.0% by weight (based on the weight of the layer) is used to provide effective suspension of wear-resistant particles. Examples of suitable particles include Aerosil® R972 and R974 as well as Aluminum Oxide C, all available from Degussa. These submicron particles are preferably added in the same order as the above-described suspension aids and preferably prior to the introduction of the wear-resistant particles.

In general, abrasion resistance of the coating or the substrate usually reflects the durability of the product. Abrasion is caused by mechanical actions such as sliding, scraping, rubbing, scuffing, etc. Abrasion results in wearing, marring, staining, and the loss of the surface properties, and eventually the bulk properties of the product.

The formulations containing the suspension aids of the present invention preferably maintain at least 25% by weight of the entire wear-resistant particles added in suspension for at least one month during storage and more preferably at least 40% by weight, and even more preferably at least 50% by weight and most preferably at least 75% by weight.

Abrasion resistance can be related to several properties of the substrate and coating such as hardness, cohesive strength, tensile strength, elasticity, toughness, thickness, etc.

Thus, to test the wear resistance of the product, several test methods have been followed: Some of them are 1) falling sand test ASTM D968; 2) air blast abrasive test ASTM D658; 3) jet abrader, method 6193 of Federal Test Method Standard # 141 C, 4) Taber abrader ASTM D4060; 5) NEMA test method LD 3.31; 7) walk test; 8) Taber scratch or modified Hoffman scratch test; and 9) Gardener scrub test, among others.

As stated earlier, with the addition of wear-resistant particles, preferably in at least one of the outermost layers exposed to the environment, improved wear and/or stain resistance are significant and lead to a better surface covering product for consumer use.

Specific examples of surface coverings which can use the wear resistant layer(s) of the present invention include a surface covering which combines chemical embossing with mechanical embossing to form a unique product. Preferably, this product is a surface covering having a natural wood, stone, marble, granite, or brick appearance, though other surface coverings having the desired combination of chemical embossing and mechanical embossing as described herein form part of the present invention. For purposes of the present invention, surface covering includes, but is not limited to, flooring such as in-aid floors, hardwood floors, solid vinyl tiles, homogeneous floors, cushioned floors, and the like; wall paper; laminates; and countertops.

Figure 8:
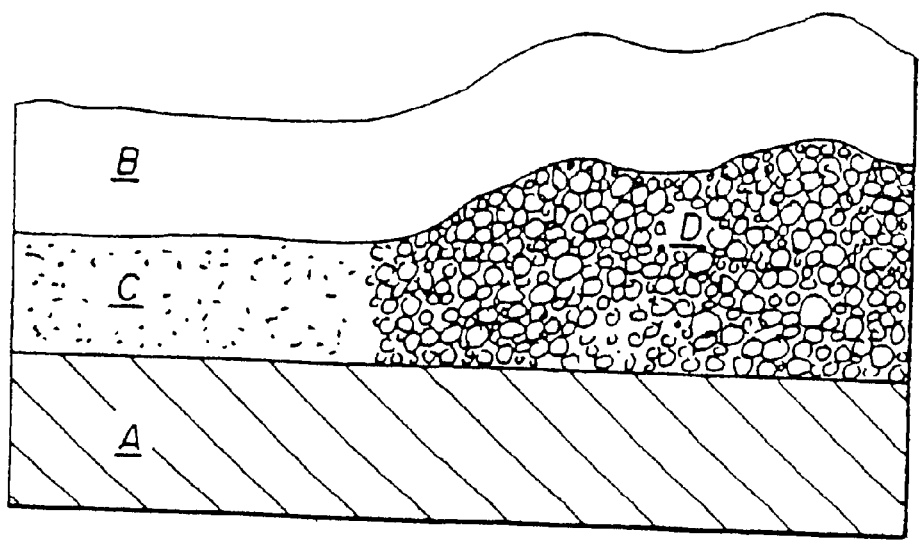
FIG. 8 is a fragmentary, cross-sectional view of a surface covering of the present invention depicting the multiple layers in detail.

In making the surface covering, a backing layer or substrate A is provided and a foamable layer C and D is formed or placed on top of backing layer A as shown in FIG. 8. A design or print layer B is applied, adhered, or located on top of the foamable layer as seen in FIG. 8. The design layer B has a design (not shown) and a portion of this design is formed with a retarder composition, such as, but not limited to, a retarder ink. Preferably, the portion of the design with the retarder composition is in the shape and form of one or more joint or grout lines (not shown) which simulate, for instance, the joint lines between two strips of wood forming a surface covering or the joining of stones, marble, granite, or brick by mortar or grout lines between each stone, marble, granite, or brick.

Once the design layer B is applied, a wear layer is applied or located on top of the design layer. The wear layer is then cured such as by subjecting the surface covering to heat to form a cured wear layer. This curing process will also chemically emboss areas of the design layer where the retarder ink has been applied. In the preferred embodiment, the chemically embossed areas are the printed joint or grout lines. Any heating means can be used, such as a gas-fired forced-hot-air oven. The product is then permitted to obtain ambient temperature, such as by cooling. Afterwards, the surface of the product is subjected to a sufficient temperature to soften the cured wear layer surface, for instance, through re-heating, preferably by infrared radiant heat. This softens the surface in order to enable the product to receive the mechanical embossing. The wear layer is then mechanically embossed to have a surface texture. Any surface texture can be embossed onto the wear layer. Preferably, the surface texture simulates or has a wood, stone, marble, granite, or brick surface texture. During mechanical embossing, the foam layer may or may not be mechanically embossed. The foam layer may be slightly embossed. In particular, in a preferred embodiment, the portions of the wear layer being mechanically embossed will compress or lose from about 3 to about 8 mils in thickness while the portions of the foam layer in contact with these portions will compress or lose from about 1 to about 5 mils in thickness. Preferably, the foam cells within the foam layer are not crushed or collapsed in the embossed areas, but may be flattened or distorted as shown in D in FIG. 8.

A top coat (not shown in FIG. 8) is then provided on top of the embossed wear layer to form the surface covering. The outer most layer exposed to the environment, for instance, in the embodiments described above, preferably contains the wear resistant particles. Thus, in a preferred embodiment, the top coat layer contains a curable resin, a suspension aid comprising a polyamine amide, a polyamide, or an unsaturated polycarboxylic acid or silica, and wear-resistant particles dispersed throughout the layer.

The top coat layer can be non-continuous and can only overlap the non-chemically embossed areas. The non-continuous top coat layer can have a different gloss from the continuous wear layer. This contrast in gloss can be to any degree. For instance, the non-continuous top coat layer can have a non-glossy finish and the continuous wear layer can have glossy finish or vice versa. The difference in gloss level between the non-continuous top coat and the continuous wear layer or a continuous top coat layer can be from about 15 to about 95, more preferably from about 25 to about 75, and even more preferably from about 35 to about 55. Typically, the gloss level is measured by a 600 glossmeter.

Figure 10:
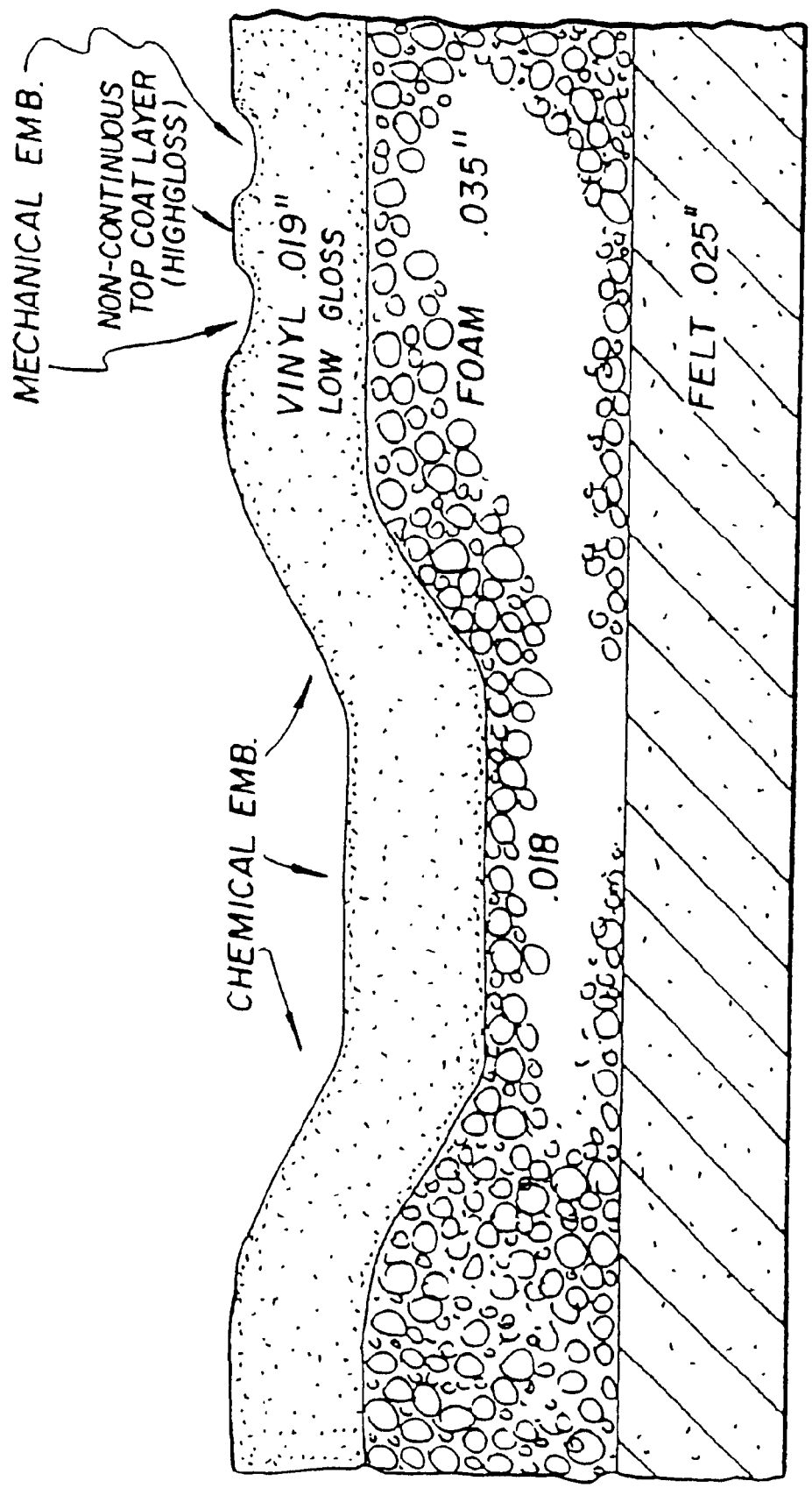
FIGS. 10 and 11 are fragmentary, cross-sectional views of surface coverings of the present invention.
Figure 11:
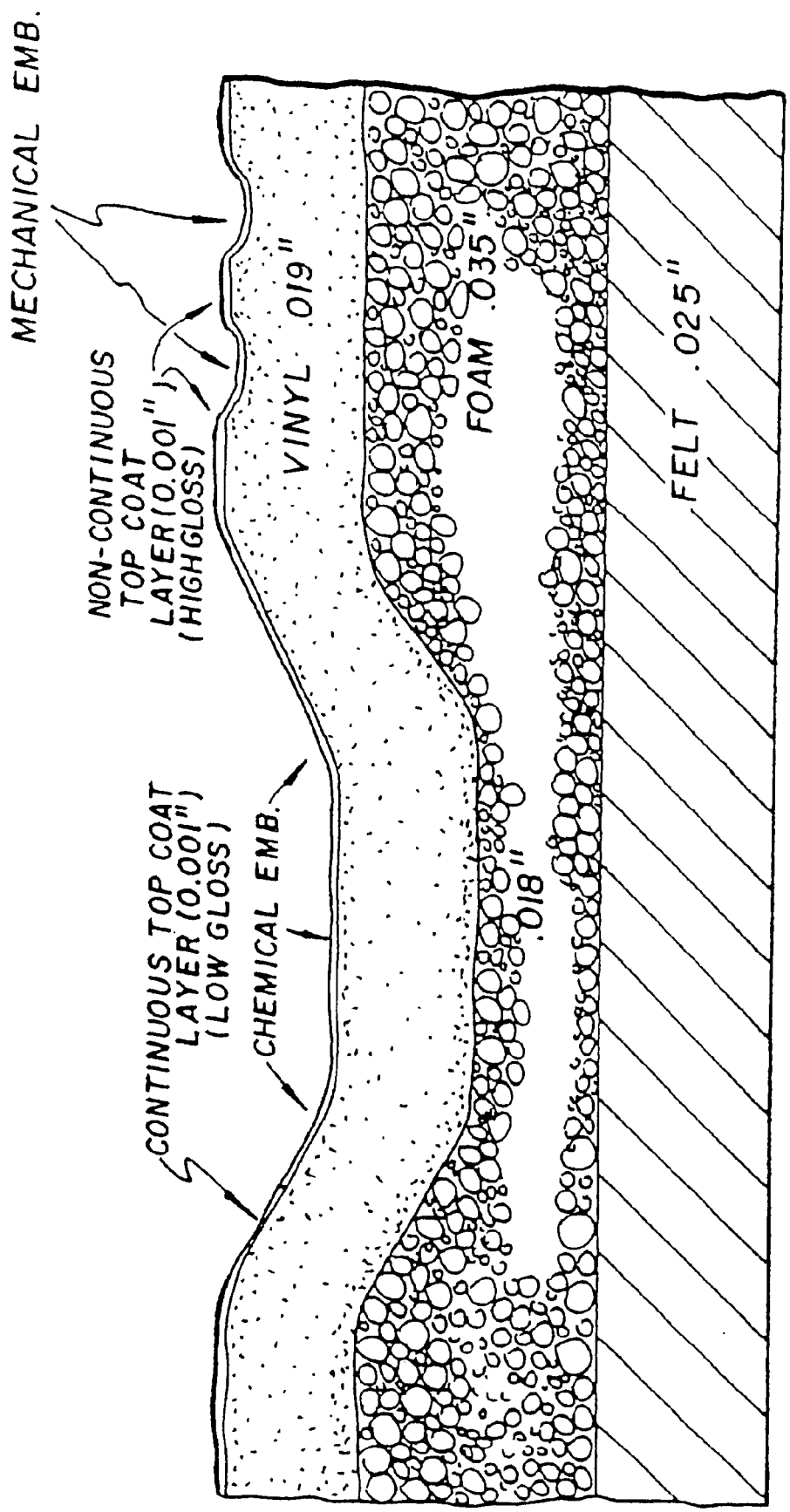

Besides the above-described embodiment, another embodiment of the present invention involves a continuous wear layer and a continuous top coat layer located above the continuous wear layer. Above the continuous top coat layer is the non-continuous top coat layer described earlier. The continuous wear layer, continuous top coat layer, and/or the non-continuous top coat layer can have wear resistant particles dispersed therein and further, each of these three layers can have the same or different gloss depending upon the desired effect. Preferably, in such an embodiment, that non-continuous top coat layer does not contain wear resistance particles and only the continuous top coat layer has wear resistant particles. FIGS. 10 and 11 further set forth these various embodiments mentioning some preferred components, however, realizing that other components can also be used.

Another embodiment of the present invention is where multiple top coat layers are used where each of these top coat layers can be continuous or non-continuous and can overlap in any fashion to create any desired effect. Each of these layers can have a different gloss level to create any desired effect.

The gloss effect can be achieved by formulating a pre-determined gloss level in each individual coating. The difference in gloss level can be achieved by using a flating agent to provide dullness. Examples of flating agents include, but are not limited to, silica. Depending on the gloss desired, the more silica present, the lower the gloss will be. Further, the wear resistant particles also contribute to a lower gloss.

The non-continuous layer can be applied in any fashion but is preferably applied with a differential roll coater such as a Dubois RCD-24 Single Station Differential Coater with a roll diameter of from about 9' to about 10.25". This differential roll coater has the ability to coat only the non-chemically embossed areas or the raised areas while not coating the recessed or embossed areas. The roll coater does have the ability to coat mechanically embossed areas if the embossing is less than 5 mils deep. Accordingly, in one embodiment of the present invention, a further design or textured appearance can be achieved by using a mechanical embosser which will create embossments 5 mils or more which will then not be coated by the non-continuous layer. Alternatively, a mechanical embosser can be used which has a pattern which creates embossments which are below 5 mils and other embossments which are about 5 mils or more which will then lead to a non-continuous layer which covers some but not all of the mechanical embossments. Again, this can lead to a very aesthetically pleasing product which can accurately represent various patterns which are being simulated.

The backing layer used in the present invention can be any conventional backing layer used in surface coverings such as a felted or matted fibrous sheet of overlapping intertwined filaments and/or fibers, usually of natural, synthetic, or man-made cellulosic origin, such as cotton or rayon, although many other forms of sheets, films, textile materials, fabrics, or the like, may be used. The substrate or backing layer can be non-foamed, non-crosslinked vinyl compositions as well, for example cellulosic felt, fiber glass scrim, and polyester non-woven sheets. The thickness of a conventional substrate layer is generally not critical and it is preferably from about 2 to about 100 mils, more preferably from about 15 to about 30 mils.

The foamable layer used in the present invention can be any conventional foamable layer used in surface coverings, such as a foam layer used in flooring. In particular, the foamable layer can be any suitable material known in the art for producing foam layers such as polyvinyl chloride plastisol or organosol. Alternatively, and preferably, the foam layer is a resilient, cellular foam layer which can be formed from a resinous composition containing a foaming or blowing agent that causes the composition to expand on heating. It is also known in the art that foamable, resinous sheet material can be selectively embossed by controlling the decomposition temperature of a catalyzed blowing or foaming agent in the heat-expandable composition. For example, by applying to the heat-expandable composition a reactive chemical compound which is referred to in the art as a "regulator," "inhibitor," or "retarder," it is possible to modify the decomposition temperature of the catalyzed foaming or blowing agent in the area of application of the reactive compound. It is thus possible to produce sheet materials having surface areas that are depressed with inhibitor application and raised proximate the area without inhibitor application.

The inhibitor or retarder can be conveniently incorporated in an inhibitor or retarder composition, preferably in a foam-retarding, printing ink composition, which is printed over the heat-expandable resinous composition. Such compositions are well-known in the art and are generally based on an organic solvent carrier or vehicle system.

Alternatively, and preferably, an aqueous retarder printing ink composition is used such as the one described in U.S. Pat. No. 5,169,435, incorporated in its entirety by reference herein. A most preferred aqueous retarder printing ink composition contains from about 20% to about 30% by weight acrylic resin binder, from about 6.5% to about 17% by weight tolyl triazole, from about 20% to about 30% by weight alcohol, and from about 35% to about 50% by weight water. Other foam-retarding, printing ink compositions can also be used such as those described in U.S. Pat. Nos. 4,191,581 and 4,083,907 to Hamilton; U.S. Pat. No. 4,407,882 to Houser, and U.S. Pat. No. 5,336,693 to Frisch, all incorporated in their entirety by reference herein. For purposes of the present invention, the retarder composition does not necessarily have to contain a printing ink.

In the present invention, for purposes of creating the foamable layer, which is chemically embossed, a substrate comprising an expandable resinous layer containing a foaming or blowing agent is provided. A printing design is provided over at least a portion of the expandable resinous layer. At least a portion of this printing design comprises a retarding composition, optionally containing printing ink. As will be described in further detail below, once a wear layer is applied on top of the foamable layer, the expandable resinous layer (e.g., the foamable layer) is then subjected to a sufficient temperature for a sufficient time to expand the layer and thereby form an embossed region of the layer proximate the portion of the printing design that contained the foaming or blowing agent modifier or inhibitor. Generally, a sufficient temperature is from about 195° C. to about 215° C. and for a time of from about 2.5 minutes to about 3.0 minutes to create the foam layer.

Prior to subjecting the expandable resinous layer and design layer to heat, a wear layer is deposited or applied on top of the design layer and the layers, along with the substrate, are subjected to heat or curing which will not only cure the wear layer, but also expand the resinous layer and cause chemical embossing as described earlier.

The portion of the design layer which does not comprise at least one retarder composition is formed by non-retarder ink compositions. An example of such an ink composition contains an acrylic resin, water, alcohol, and one or more pigments. In forming a design having both a retarder composition and one not containing a retarder composition, such a design can be done in register using multiple station rotogravure printing. As indicated earlier, in the preferred embodiment of the present invention, a design layer contains a pattern of joint or grout lines which are created with at least one retarder composition. Upon expansion of the foamable layer, these portions will be chemically embossed and will visually form joint or grout lines to simulate such lines which exist with natural wood, stone, marble, granite, or brick surfaces. The joint or grout lines created with the retarder composition generally will have a width of, for example, from about 1/16 inch to about 1/4 inch.

The wear layer can be made of any suitable material known in the art for producing such wear layers. Preferably, the wear layer is a transparent poly(vinyl chloride) layer. The dry film thickness of this PVC layer is not critical and it is preferably from about 5 mils to 50 mils, and more preferably from about 10 mils to about 20 mils. Other examples of this wear layer include, but are not limited to, acrylic polymer, polyolefins, and the like.

As indicated, this wear layer can be applied to and adhered to the foamable layer. Means to apply the wear layer to the foamable layer are known in the art and include, but are not limited to, a reverse-roll coater. Once the wear layer is applied to the top of the foamable layer, the wear layer is cured. This curing can be accomplished by subjecting the wear layer along with the foamable layer and substrate to a sufficient temperature, e.g., by heating, to cure the wear layer in a multi-zone gas-fired hot air oven essentially as described in U.S. Pat. No. 3,293,108. Also, the curing or heating step will expand the foamable layer to form the foam layer which will have chemically embossed areas. For purposes of curing the wear layer, a sufficient temperature for a sufficient time would be used and known to those skilled in the art. Preferably, this temperature is from about 195° C. to about 215° C. for a time of from about 2.0 minutes to about 3.0 minutes, more preferably about 2.0 minutes to about 2.2 minutes.

Once the wear layer is cured, it is preferred to permit the wear layer to obtain an ambient temperature, such as by passing it over a series of water-cooled drums or "cans" essentially as described in U.S. Pat. No. 3,293,108. The wear layer is then subjected to a sufficient temperature for a sufficient time in order to soften the wear layer to a sufficient degree to allow it to be mechanically embossed. The surface temperature of the wear layer for purposes of embossing is preferably from about 145° C. to about 160° C. depending on, among other things, the color of the wear layer surface. The mechanical embossing of the wear layer can be achieved in such a manner that the foam layer beneath the wear layer may or may not be mechanically embossed. The portions or areas of the foam layer beneath the areas or portions of the wear layer that are embossed are generally slightly embossed. For purposes of the present invention, any embossing technique known to those skilled in the art can be used; for example, the product can be fed through a nip between an engraved steel embossing roll and a rubber back-up roll, such that the face of the wear layer is in contact with the engraved steel roll. See FIG. 7. The embosser gap can "float" against a fixed pressure, or more preferably the embosser gap can be "fixed" by adjustable steel "wedge blocks" for example. However, the fixed gap approach requires that careful attention be paid to maintaining consistent caliper of the product prior to entry into the embosser section of the process. The preferred starting point for the fixed gap is 60% of the specific product caliper. Fine-tuning adjustments can then be made to achieve the specified appearance. Furthermore, in order to maintain faithful reproduction of the embossing roll engraving in the embossed surface covering, it is advantageous to maintain some positive tension or "draw" on the web as it enters the nip. This tension also helps to keep the web tracking straight.

For purposes of mechanical embossing, generally, the pressure applied to the wear layer is sufficient to create an embossing of, for example, from about 1 mil to about 12 mils, more preferably from about 3 mils to about 8 mils. It is certainly within the bounds of the present invention to use several devices to mechanically emboss different textures onto the wear layer. In the preferred embodiment of the present invention, the device used to mechanically emboss will have a pattern that will simulate the surface texture of wood, stone, marble, granite, or brick and this texture will be transferred onto the wear layer.

Figure 7:
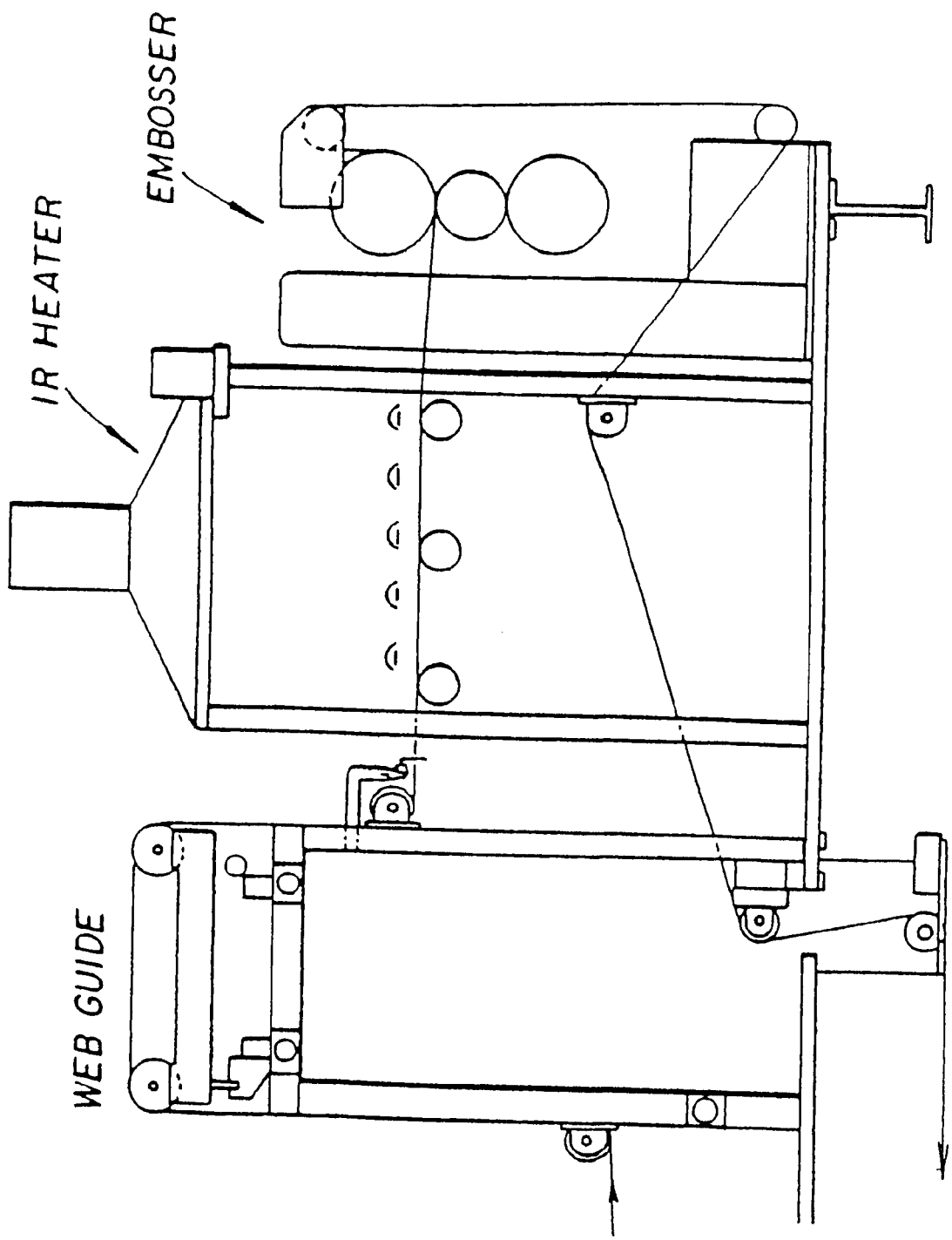
FIG. 7 depicts a side view of an apparatus for embossing the surface covering of the present invention.

In accordance with the invention and as shown in FIG. 7, a cured, foamed, and cooled surface covering is processed as follows to produce a surface having a "natural" appearance. A web of cooled cushioned covering is passed through the "WEB GUIDE" at the point indicated by the entry arrow. This "WEB GUIDE" is provided to insure that the web tracks straight through the embosser nip. After exiting the "WEB GUIDE," the web passes under the five burners of the "IR HEATER." The heat output of the "IR HEATER" is adjusted as necessary to properly heat the surface of the web by adjusting the height of the burners above the web, and by adjusting the gas flow to the burners.

From the "IR HEATER" the web proceeds to the "EMBOSSER." The hot surface of the web contacts an engraved steel embossing roll. The embossing nip, mentioned above, includes the engraved steel embossing roll and a rubber bed roll, which contacts the back surface of the web. The rubber bed roll is provided with a steel back-up roll which can be used, if necessary, to counteract any tendency of the rubber roll to "bow" downward. The web is maintained in contact with the water-cooled embossing roll for about 90° of Wrap by means of the uppermost idler roll. This contact with the cooled embossing roll surface removes some of the heat from the surface of the web by heat transfer from the web sheet to the water-cooled steel embossing roll, and thus "sets" the embossing. The dwell time is dependent on exact embossing roll circumference and line speed and can be easily determined by one skilled in the art. Approximate dwell time ranges are given for three possible web speeds in Table 1 below.

TABLE 1

| Web Speed (ft./min.) | Dwell Time Range (seconds) |
|---|---|
| 48 | 1.6–1.8 |
| 60 | 1.3–1.4 |
| 70 | 1.1–1.2 |

The cooled embossed web is then directed back under the "IR HEATER" section of the apparatus. At the point indicated by the exit arrow, the web continues on to a final coating station (not shown) for applying a top coat to the surface of the web as described below. The apparatus for this coating station is well known to those skilled in the art.

As indicated above, an important feature of the invention is the surface temperature of the web at the exact instant when the web sheet enters the embossing roll nip. This temperature is dependent on the thickness of the layer, the speed of the moving web, and the exact position where the measurement is taken. However, this exact spot is not generally accessible for temperature measurements because of the diameter of the embossing roll. Normally, therefore, the reading is taken from the mid-point of the distance between the end of the IR heater and the embossing roll nip. The actual temperature as the web sheet enters the embossing roll nip will be lower than this reading because of heat loss from the web sheet surface as it moves through the space between the measurement point and the embossing roll nip. The faster the line speed, the less opportunity for heat loss and the closer the actual temperature will be to the measured temperature at the embossing nip.

A guide for temperature ranges based on web speed and layer thickness for vinyl is given below in Table 2. It should be remembered, however, that the ability of a surface to absorb heat from IR energy is dependent, among other things, on the color of that surface. Thus, the exact temperature within the preferred range will depend on the predominate color of the sheet being embossed. Therefore, these conditions are starting conditions only, and fine tuning adjustments can be made as needed to achieve the desired product appearance specified.

TABLE 2

| clear vinyl caliper | web speed (ft./min.) | temperature range ° C. |
|---|---|---|
| .019" | 48 | 155–160 |
| .014" | 60 | 150–155 |
| .012" | 70 | 145–150 |

Once the wear layer is mechanically embossed, a top coat, also known as a wear layer top coat, is applied to the top and adhered to the embossed wear layer. The top coat can be composed of any suitable material known in the art for this purpose. Preferably, the top coat is a urethane top coat. Once the top coat is applied, the overall surface covering containing all of the layers is cured. Preferably, the top coat has a thickness of from about 0.5 mil to about 2.0 mils, more preferably, from about 0.9 mil to about 1.3 mils.

Optionally, besides the layers discussed above, one or more additional layers can be present, such as the layers described in U.S. Pat. No. 5,458,953, incorporated in its entirety by reference herein. Such additional layers include strengthening layers, additional foamable layers, and a wear layer base coat. Examples of the composition of these layers and their locations are described in U.S. Pat. No. 5,458,953 and can be used in the surface covering of the present invention.

Figure 9:
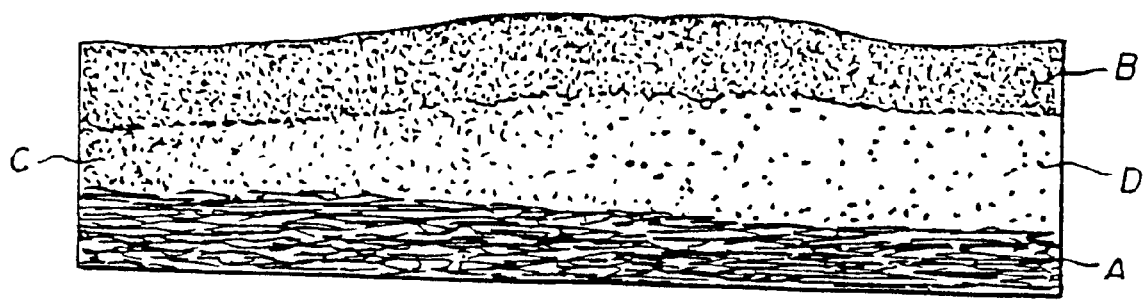
FIG. 9 is a microscope photograph of a surface covering of the present invention.

As indicated earlier, the present invention also relates to a surface covering as seen in the photograph of FIG. 9. This surface covering has a backing layer A, a foam layer C and D applied on top and adhered to the backing layer. A design layer B having a design is printed on the foam layer. At least a portion of the design layer includes a chemically embossed pattern. Preferably, this chemically embossed pattern is in the shape and form of joint or grout lines as previously described. A wear layer is applied on top of the design layer and this wear layer is mechanically embossed with a surface texture. The foam layer C and D may or may not be mechanically embossed. The surface texture is preferably the texture of wood, stone, marble, granite, or brick. Finally, a top coat or wear layer top coat (not shown in FIG. 8) is applied on top of and adhered to the embossed wear layer. Wear resistant particles can be located in the wear layer and/or top coat. The details of each of these components is described above.

As also indicated, additional optional layers such as those described in U.S. Pat. No. 5,458,953 can be incorporated into this surface covering. Such additional optional layers include a strengthening layer, a wear layer base coat, and/or additional foam layers.

The present invention will be further clarified by the following examples, which are intended to be purely exemplary of the present invention.

EXAMPLES

In testing the product of the invention, the NEMA LD-3.31 test was modified by using 220 grit sandpaper with a 500 grams weight, and changing the paper every 500 cycles. The sandpaper was pasted onto CS-17 wheels supplied by Taber. In normal Taber abrasion test, CS-17 wheels are used with 1000 grams weight. The Gardener scrub test employs a 100 grit sandpaper with 577 grams weight.

This test determined the initial or final wear-through or a change in the surface property. In each set of tests, the product without alumina was used as the control.

As a representative of the several hard inorganic and organic material, different amounts of fused or calcined alumina with the characteristics described above were used in the following experiments:

Substrates: vinyl sheet goods (the construction is described in U.S. Pat. No. 5,405,674); solid vinyl tile; homogeneous vinyl sheet; and hardwood flooring.

The alumina was sprinkled on wet urethane based acrylate and mixture of acrylates and cured by UV-radiation. While alumina was used in the examples, other types of wear-resistant particles can be used.

Example 1

A homogenous vinyl sheet was prepared by forming a vinyl sheet, and on top of an urethane "wet" coat, aluminum oxide was scattered and then the coating cured.

TABLE 3

Effect of weight of fused alumina (aluminum oxide) on homogenous vinyl sheet

| Weight of alumina (30 micron average particle size)g/m² | Gloss | # of Taber cycles to wear through the top coat[a] |
|---|---|---|
| 0 | 81 | 50 |
| 5 | 81 | 125 |
| 10 | 76 | 150 |
| 15 | 77 | 350 |
| 20 | 79 | 500 |

[a]Modified NEMA test LD3.31

From Table 3, is clear that as the weight of alumina was increased, the wear resistance of the top coat also increased. Higher amounts of alumina could be incorporated depending on the wear resistance equipment. In a range of 1 g/m² to 50 g/m², the other desirable properties of the vinyl sheet goods were not affected. The preferred range of the weight of alumina is about 3 g/m² to about 40 g/m². The top coat thickness was varied from about 0.9 to about 1.5 mils. This is a typical example, but different particle sizes and amounts could be used.

Example 2

A sheet was made as in Example 1 but for the parameters set forth in Table 4.

TABLE 4

Effect of the particle size of alumina on the wear resistance of homogenous vinyl sheet

| Average particle size of alumina in microns | Weight of alumina (g/m²) | No. of cycles to wear through the top coat[a] |
|---|---|---|
| 0 | 0 | 2500 |
| 30 | 15 | 3000 |
| 40 | 15 | 3750 |

[a]The abrasion was tested by Taber abrader with CS-17 wheels with 1000 grams weight.

Example 3

The incorporation of alumina in the wear layer also increased the wear resistance of the homogenous vinyl sheet goods made as in Example 1, but for the parameters set forth in Table 5.

TABLE 5

Effect of incorporation of alumina in the top coat of solid vinyl sheet (inlaid)

| Weight of alumina (g/m²) | No. of cycles for initial wear through[a] |
|---|---|
| 0 | 50 |
| 5 | 75 |
| 10 | 125 |
| 15 | 150 |

[a]Modified NEMA test DL-3.31

Example 4

A two-layered floor product was made having an urethane-based-acrylate base coat and an urethane-based top coat on a vinyl sheet. Each of the samples had substantially the same thickness for each layer. The effects of wear-resistant particles on each layer can be seen in Table 6.

TABLE 6

Effect of placement of alumina on the wear resistance of solid vinyl sheet

| Average weight of alumina (average particle size 30 microns) in the base coat (g/m²) | Average weight of alumina (average particle size 30 microns) in the top coat (g/m²) | Average No. of cycles for initial wear through[a] |
|---|---|---|
| 0 | 0 | 100 |
| 25 | 25 | 1750 |
| 0 | 25 | 1350 |
| 0 | 15 | 1250 |
| 0 (Vinyl Wear Layer) | 0 | 100 |
| 0 (Vinyl Wear Layer) | 25 | 600 |
| 0 (Vinyl Wear Layer) | 15 | 500 |

[a]Modified NEMA test LD-3.31

Thus, by properly selecting the particle size, weight, and the location of alumina in a product construction, the desired wear resistance could be achieved.

Example 5

To demonstrate the excellent wear resistance by the incorporation of alumina in the top coat, a Gardener Scrubber test was also conducted on a sample like Example 4 and as described in Table 7.

Gardener Scrub Test Method:

The substrate was mounted onto a Gardener scrubber and scrubbed with a 100 grit sandpaper with 577 grams weight for 1000 cycles changing the sandpaper every 500 cycles. The substrate was then stained with oil brown to estimate the extent of wear. The extent of wear is directly related to the extent of staining, with a stain rating of 0 being no stain (excellent wear characteristics without any surface damage) and 3 being worse (with severe surface damage to the top-coat).

TABLE 7

Effect of incorporation of fused alumina into the top coat of solid vinyl sheet (inlaid) on its wear resistance

| Weight of alumina (average particle size 30 micron) incorporated into the top coat (g/m²) | Stain rating after 1000 cycles of scrub |
|---|---|
| 0 | 3 |
| 5–7 | 0.5 |

In general, at a given particle size the wear resistance increases as a function of the amount of alumina (see Tables 3, 5, 6, and 8, and FIG. 1).

Example 6

In this Example, aluminum oxide was added to a urethane top coat which eventually formed part of a wood floor product. The conditions are described below.

TABLE 8

Aluminum Oxide in Wood Urethane Based Topcoat

| Sample | Number of Cycles for Initial Wear Through | Number of Cycles for Final Wear Through | Overall Coating Thickness in mils | Thickness of Base and Top Coats applied in mils | Number of Passes During Curing Process | Gloss Avg./Std. Dev |
|---|---|---|---|---|---|---|
| 1 | 159 | 752 | 1.5–1.6 | 0.5/1.0 | 2 | 79.8 ± 12.7 |
| 2 | 394 | 794 | 1.5–1.6 | 1.0/0.5 | 2 | 90.4 ± 1.5 |
| 3 | 528 | 662 | 1.6–1.8 | 1.5 | 1 | 72.4 ± 2.9 |
| 4 | 274 | 943 | 1.6–1.7 | 0.5/1.0 | 2 | 68.4 ± 18.1 |
| 5 | 529 | 957 | 1.8–2.0 | 1.0/0.5 | 2 | 82.8 ± 6.3 |
| 6 | 549 | 775 | 1.7–1.8 | 1.5 | 1 | 55.6 ± 1.7 |
| 7 | 97 | 223 | 1.4–1.6 | 0.5/1.0 | 2 | 84 ± 7.6 |
| 8 | 111 | 305 | 1.5–1.8 | 1.0/.0.5 | 2 | 90.2 ± 1.3 |
| 9 | 78 | 143 | 1.3–1.5 | 1.5 | 1 | 80.6 ± 5.4 |

Notes:
Samples 1–3, aluminum oxide with average particle size of 25 microns used at 10 g/m² application rate.
Samples 4–6, aluminum oxide with average particle size of 25 microns used at 20 g/m² application rate.
Samples 7–9, no aluminum oxide used.
Aluminum oxide sifted through 400 mesh screen.

Application Method:
No. 6 mire rod used for 0.5 mil. draw.
No. 8 mire rod used for 1.0 mil. draw.
No. 14 mire rod used for 1.5 mil. draw.

TABLE 9

| Curing Conditions | UV Lamp Intensity Watts/Inch | Curing energy in milli Joules/cm² |
|---|---|---|
| First pass samples 1, 2, 4, 5, 7, and 8 | 125/off | 200 |
| Second pass samples 1, 2, 4, 5, 7, and 8 | 200/200 | 1030 |
| One pass cure sample 3, 6 | 200/200 | 1030 |

Example 7

A urethane coating containing wear-resistant particles was prepared as follows using the following ingredients:

| Ingredient | Formula | |
|---|---|---|
| | Weight (lbs) | Percent by wt. |
| Urethane based acrylate (U312 Photoglaze) from Lord Corporation | 265 | |
| BYK-088 Defoamer | 2.3 | 0.42 |
| Anti-Terra 204 Suspension Aid | 4.3 | 0.79 |
| Aluminum Oxide (WCA 50) | 271 | 50.0 |
| Total | 542 | |

Procedure for Mixing: Mixing was done on a Shar high shear mixer with a 2 inch diameter shaft, where the blade was set eight inches from the bottom of the drum. Blade diameter was eight inches. The single blade was a high shear saw-tooth blade.

The liquid urethane based acrylate was added into a 55 gallon drum, and then the defoamer was added and the mixture slowly mixed for one minute using a mixing speed of about 960 rpm. Afterwards, the suspension aid was added and the mixture was stirred for one more minute at the mixing speed of 960 rpm. Then, the aluminum oxide was slowly added and the vortex was just above the blade, but not down to the mixing blade.

As the aluminum oxide was added, the speed of the mixing blade was increased from 960 rpm to 1850 rpm to maintain the vortex level. The mixture was mixed for 35 minutes.

The viscosities of the resulting mixture were measured as shown in Table 10. Table 10 further shows two other formulations made in the same manner but for the type of aluminum oxide used.

TABLE 10

| | Brookfield viscosities (#4 spindle) Aluminum oxide Type | | |
|---|---|---|---|
| Brookfield rpm | WCA 50 | WCA 60 | ALR 180 |
| 20 rpm | 6300 | 8100 | 8700 |
| 5 rpm | 13200 | 16800 | 18000 |
| 0.5 rpm | 68000 | 80000 | 88000 |
| Time from mix | 3 hours | 2 hours | 2.5 hours |

Severs Viscometer Throughput, grams, Orifice dimensions: Length 5.00 cm. Diameter 0.155 cm.

TABLE 11

| | Severs Viscometer (grams effluent/min) | | |
|---|---|---|---|
| Psi | WCA 50 | WCA 40 | ALR 180 |
| 40 | 60.0 | 52.4 | 42.0 |
| 60 | 73.0 | 62.6 | 57.8 |
| 80 | 91.4 | 71.4 | 68.4 |
| Time from mix | 5 hours | 4.75 hours | 4.75 hours |

The average particle size for the aluminum oxide was: WCA 50=50 microns; ALR 180=150 microns; and WCA 60=60 microns.

The formulation was formed into a coating using an air knife coater and cured using the following parameters.

A. Air Knife

Applicator roll speed=18 to 21 fpm

Applicator Roll Speed=0.61 setting

Air Knife Distance=0.18

Air Knife Angle=38.3

Air Knife Pressure=4.2 psi

B. UV Curing Conditions

First unit lamp one=125 W/in lamp two=200 W/in lamp three=125 W/in

Second Unit lamp one=200 W/in

Aluminum Oxide Materials:

WCA 50 and 60 are products from Micro Abrasives Corporation, 720 Southhampton Rd., Box 669, Westfield, Mass. 01086-0669

ALR 180 White Aluminum oxide is distributed by Composition Materials, Co., Inc., 1375 Kings Highway East, Fairfield, Conn. 06430.

The cured coating was examined visually and appearance was acceptable.

Example 8

A cured urethane based acrylate (U337 from Lord Corporation) was made and tested as described in Table 12.

In this example, 35% by weight of 30 micron aluminum oxide, 1% of suspension aid and 0.4% by eight of defoaming agent were mixed together to form formulations with radiation curable urethane based acrylates.

Substrate: Homogenous (solid) vinyl sheet (inlaid).

Curing: UV cured with medium pressure mercury lamps by a differential cure method known to them who practice the art of radiation curing. A total energy of 1800 10 to 2500 mH/cm$^2$ was used.

TABLE 12

Effect of different dispersing agent on the properties of the wet and cured urethane based acrylate

| Properties | Coating | D-161 | D-164 | D-170 | D-108 | ATU-80 | Lact. | P105 | AT-204 | AT-P | Sprinkling |
|---|---|---|---|---|---|---|---|---|---|---|---|
| Type of susp. aid | | HMW Polymer | HMW Polymer | HMW Polymer | LMW Polymer | LMW Polymer | LMW Polymer | | | | |
| % solids of susp. aid | | 30 | 60 | 30 | 98 | 80 | 50 | 97 | 52 | 41 | |
| Polarity/charge | | polar | less polar | more polar | Cationic | Neutral | Anionic | Anionic | Neutral | Cationic | |
| Nature | | Deflocculating | Deflocculating | Deflocculating | Deflocculating | Deflocculating | Deflocculating | Controlled flocculating | Controlled flocculating | Controlled flocculating | |
| Chemical Compositions | | Blk. copolymer with pigment affinic groups | | | C-acid tests[a] | poly-amine[b] | amide-SP | poly-carcid[d] | poly-amine[e] | Poly amine[f] | |
| Viscosity in cps with Brookfield Spindle #4 | | | | | | | | | | | |
| 20 RPM | 1550 | | | | 2000 | 2200 | 1800 | 2050 | 3300 | 2100 | |
| 5 RPM | 1400 | | | | 2200 | 2600 | 2000 | 3200 | 5600 | 3000 | |
| 0.5 RPM | | | | | 2000 | 4000 | 2000 | 7000 | 22000 | 6000 | |
| Settling after 3 hrs. | | Hard settle | Hard settle | Hard settle | none | none | none | none | none | none | |
| After 2 days | | | | | ⅛" soft settle | none | ¾" soft settle | none | none | none | |
| After 5 days | | | | | soft ½" | soft ⅛" | Hard settle | none | none | none | |
| After 15 days | | | | | Hard settle | Hard settle | | none | some clear coating on top | some clear coating on top | |
| Gloss | 23 | | | | 26 | 25 | | 27 | 24 | 25 | 20 |
| Coating thickness/mil | 1.3 | | | | 1.5 | 1.6 | | 1.9 | 2.2 | 1.7 | 1.5 |
| Taber Initial wear thro/cys | 25 | | | | 65 | 55 | | 130 | 150 | 65 | 55 |
| Taber Final wear thro/cys | 100 | | | | 150 | 150 | | 250 | 325 | 200 | 300 |
| Normalized initial wear (1.3 mil) | 25 | | | | 56 | 45 | | 89 | 87 | 50 | 48 |
| Normalized final wear (1.3 mil) | 100 | | | | 130 | 122 | | 171 | 192 | 153 | 260 |
| Stain Ambient | | | | | | | | | | | |
| Mustard | 0.0 | | | | 0.0 | 0.0 | | 0.0 | 0.0 | 0.0 | 0.0 |
| Oil | 0.0 | | | | 0.0 | 0.0 | | 0.0 | 0.0 | 0.0 | 0.0 |
| Brown Shoe Polish | 0.5 | | | | 0.5 | 0.5 | | 0.5 | 0.5 | 0.5 | 0.5 |

TABLE 12-continued

Effect of different dispersing agent on the properties of the wet and cured urethane based acrylate

| Properties | Coating | D-161 | D-164 | D-170 | D-108 | ATU-80 | Lact. | P105 | AT-204 | AT-P | Sprinkling |
|---|---|---|---|---|---|---|---|---|---|---|---|
| Iodine | 3.0 | | | | 3.0 | 3.0 | | 3.0 | 3.0 | 3.0 | 3.0 |
| Asphalt | 0.0 | | | | 0.0 | 0.0 | | 0.0 | 0.0 | 0.0 | 0.0 |
| Sharpie Blue | 0.5 | | | | 0.5 | 0.5 | | 0.5 | 0.5 | 0.5 | 0.5 |
| Chem Lawn | 0.0 | | | | 0.0 | 0.0 | | 0.0 | 0.0 | 0.0 | 0.0 |
| Total Stain | 4.0 | | | | 4.0 | 4.0 | | 4.0 | 4.0 | 4.0 | 4.0 |

[a]Hydroxyfunctional carboxylic acid ester with pigment affinic groups.
[b]Solutions of a salt unsaturated polyamine amide and lower molecular weight acid polymers.
[c]Solutions of a partial amide and alkylammonium salt of a lower molecular weight unsaturated polycarboxylic acid polymer and polysiloxane copolymer.
[d]Lower molecular weight unsaturated polycarboxylic acid.
[e]Solution of a carboxylic acid salt of polyamine amides.
[f]Solution of a phosphoric acid salt of long chain carboxylic acid polyamine amides; Blk. - Blocks; grs. - groups.
[g]Some of the defoamer and part of the coating form a thin layer, however, there is not settling of aluminum oxide. Hard settle implies that the sample can not be mixed by hand with the aid of a spatula. Initial and final wear determined by modified NEMA LD-3.31 test 220 grit sand paper with 500 grams weight was used. Sand paper was changed every 500 cycles. Coupling means coating without aluminum oxide. Sprinkling means 5.10 g/m$^2$ of aluminum oxide is sprinkled on the wet coating and then cured.
HMW - High molecular weight; LMW - Low molecular weight.

From Table 12, the following conclusions can be made

1. Basic Deflocculating agents do not suspend aluminum oxide without hard settling.
2. Controlled flocculating agents aid the suspension of aluminum oxide without any hard settling. The formulations with controlled flocculating agents are more thixotropic (shear thinning) than those with flocculating agents.
3. Controlled flocculating agents increase the viscosity (measured at low shear rates) of the final formulation several times, which helps in suspending aluminum oxide.
4. Deflocculating agents do not increase viscosity at low shear rates to a greater extent compared to controlled flocculating agents. Thus, the deflocculating agents are not as effective as controlled flocculating agents in suspending aluminum oxide over long periods of time.

Example 9

A homogenous solid vinyl sheet was prepared with a urethane based acrylate topcoat having the following components.

Urethane based acrylate coatings with aluminum oxide: contain 30% by weight of aluminum oxide, 0.8% by weight of Anti-Terra-204 suspension aid and 0.4% by weight of a BYK088 defoamer. A coating was formed and cured at 1500–2500 mJ/cm$^2$ using medium pressure mercury vapor lamps.

Substrate: Homogenous (solid) vinyl sheet (inlaid)

TABLE 13

Effect of the type and particle size of alumina of the properties of top coat.
Viscosity (Brookfield Spindle #4)/cps @ 76° F.

| Properties | Control | 30 μCM | 40 μCM | 50 μCM | WCA30 | WCA40 | WCA50 | Sprink |
|---|---|---|---|---|---|---|---|---|
| 20 rpm at RT/cps | 1300 | 2,500 | 2,500 | 2,350 | 2,500 | 2,300 | 2,350 | — |
| 5 rpm at RT/cps | 1400 | 4,000 | 3,800 | 3,400 | 3,600 | 3,400 | 3,400 | — |
| 0.5 rpm at RT/cps | — | 10,000 | 10,000 | 10,000 | 8,000 | 8,000 | 8,000 | — |
| Settling | — | minor | minor | minor | minor | minor | minor | — |
| 60° Gloss | 25–30 | 22–26 | 26–28 | 21–26 | 22–27 | 22–25 | 21–25 | 19–23 |
| Coating thickness/mil | 1.3 | 1.6 | 1.6 | 1.7 | 1.5 | 1.7 | 1.5 | 1.5 |
| Taber Initial wear/cy | 25 | 75 | 100 | 160* | 65 | 80 | 120* | 50 |
| Normalized initial wear | 25 | 61 | 81 | 122 | 56 | 61 | 104 | 43 |
| Surface defects | None | None | None | Streaks | None | None | Streaks | None |

*Sand paper changed after 100 cycles in the NEMA test.
Control - Doese not contain any aluminum oxide.

Control—Does not contain any aluminum oxide.
Sprink—5–10 g/m$^2$ of aluminum oxide is sprinkled on the wet coating and then the coating is cured.
The particle size mentioned here is the average particle size.

The following observations were made:
1. Fused alumina (CM-Composition Material) offered more wear resistance than the calcined alumina (WCA aluminum oxide from Micro Abrasives).
2. Larger particle size alumina increased the wear resistance.
3. 40 micron alumina from Composition Material had the best balance of properties.
4. Incorporation of aluminum oxide in the coating increased the abrasion resistance of the coating. The abrasion resistance of the coating was determined by the amount and the size of the aluminum oxide used.
5. All the coatings containing aluminum oxide mentioned in Table 13 were shear thinning.

Example 10

A formulation containing urethane based acrylate resin (U337) aluminum oxide, a suspension aid as shown in Table 14 was prepared and tested for settling properties.

TABLE 14

Effect of Suspension Aids (30% of 30 μCM Al$_2$O$_3$ in coating)
Aluminum oxide (30 micron from Composition Material)
mixed in the following proportion:

| Sample | Suspension Aids | Wt. % of Susp. Aids | Wt. % of Al$_2$O$_3$ | Settling | Density g/cc |
|---|---|---|---|---|---|
| 1 | — | — | — | — | 1.08 |
| 2 | — | — | 30 | Hard settle | 1.38 |
| 3 | Disperbyk-161 | 1 | — | — | 1.08 |
| 4 | Disperbyk-161 | 1 | 30 | Hard settle | 1.39 |
| 5 | Anti-Terra-204 | 1 | 30 | None | 1.33 |
| 6 | Anti-Terra-204 | 1 | — | — | 1.09 |

The following observations were made.
1. Addition of the flocculating agent like Disperbyk does not change the density of the total formulation, and does not aid in the dispersion or suspension of aluminum oxide in the coating.
2. However, controlled flocculating agents like Anti-Terra-204 aid in the dispersion of aluminum oxide in the coating and also suspend the heavy aluminum oxide particles very well without hard settling.
3. The coating containing both Anti-Terra-204 and aluminum oxide was shear thinning and suitable for storage and subsequent use as shown in FIGS. 2–6 which show the viscosity of formulations containing suspension aids and aluminum oxide as well as controls.
4. The lower density of sample 5 compared to sample 2 indicated that Anti-Terra-204 stabilized the aluminum oxide particles in the coating by controlled flocculation.
5. From the viscosity measurements, as shown in FIGS. 2–6, it can be seen that the deflocculating agent like Disperbyk-161 did not increase the low shear viscosity of the final formulation with aluminum oxide. However, the use of controlled flocculating agents like Anti-Terra-204 increased the low shear viscosity of the final formulation significantly with a slight decrease in the bulk density of the formulation which aided the effective dispersion and the long term stability of the system.

Example 11

Solid vinyl (inlaid) sheet covering was made according to U.S. Pat. No. 5,670,237 and was coated with radiation curable urethane based acrylates containing aluminum oxide with 1% by wt. of controlled flocculating agent Anti-Terra--204, by a roll coater and air-knife. The wear resistance was measured and is shown in Table 15.

TABLE 15

| Properties | Coating w/o alumina | Coating + 26% by wt. alumina |
|---|---|---|
| Initial wear thro'/cy* | 25 | 50 |
| Stain performance | good | good |
| Gloss | 23 | 20–22 |

*NEMA test as mentioned before.

The following observations were made.
1. The coating containing the aluminum oxide could easily be processed on line similar to coatings without aluminum oxide.
2. The addition of aluminum oxide into the coating increased the wear resistance of the coating without affecting the gloss and the stain performance of the coating.

Example 12

A formulation containing 25% by weight of 30 micron fused aluminum oxide with 1% of Anti-Terra-205 suspension aid and 0.4% of BYK088 as the antifoaming agent was prepared. The formulation was formed into a coating and cured as in Example 7. Table 16 sets forth some measured parameters.

TABLE 16

Effect of Suspension Aid on Surface of Coating Containing Aluminum Oxide

| Properties | 30μ |
|---|---|
| Brookfield Sp. #4 temp. | 79° F. |
| 0.5 RPM/cps | 8000 |
| 5 RPM/cps | 3400 |
| 20 RPM/cps | 2300 |
| Coating Thickness/mil | 1.5 |
| Gloss | 18 |
| Taber Initial wear thro'/cys | 50 |
| Final wear thro'/cys | 140 |
| Total stain rating | 4.0 |

As shown in Table 16, the suspension aid was an effective dispersant. Also, the cured coating had acceptable properties for use as a floor product.

Example 13

Sub-micron particles (5–25 nm) were used in combination with Anti-Terra-204 suspension aid to further enhance the dispersion of heavy particles such as fused or calcined aluminum oxide or other heavy or light solids in coatings or liquids.

Mixing Procedure:

The sub-micron particles such as fumed alumina and fumed silica were incorporated into the coating by high shear mixing and then suspension aids like BYK-P-105, Anti-Terra-204 and Anti-Terra-P and the required amount of aluminum oxide were dispersed in the coating as described before. 0.1–5 wt. % of the sub-micron size fumed alumina or silica or combinations thereof were used in combination with the suspension aid.

Settling: The amount of clear coating separating on top of the formulation when subjected to 125° F. and measured as a function of time in inches to check the stability of the final formulations.

Fumed silica was Aerosil R972, Aerosil 974, Fumed alumina was: Aluminum oxide C. all are from Degussa Corp. Ridgefield Park, N.J. 07660 and 3500 Embassy Parkway, Akron, Ohio 44333-8327.

Coating: Radiation curable urethane base acrylates.

TABLE 17

Effect of ultra-fine (nm Size) silica and alumina particles as suspended on enhancing agents

| Formulation/Properties | Formulation 1 | Formulation 2 | Formulation 3 | Formulation 4 | Formulation 5 | Formulation 6 | Formulation 7 (Control) |
|---|---|---|---|---|---|---|---|
| Aerosil-R972 | 0.5 wt % | 2.0 wt % | | | | | |
| Aerosil-R974 | | | 0.5 wt % | 2.0 wt % | | | |
| Aluminum Oxide C | | | | | 0.5 wt % | 2.0 wt % | |
| Anti-Terra-204 | 1 wt % | 1 wt % | 1 wt % | 1 wt % | 1 wt % | 1 wt % | 1 wt % |
| 30µ fused $Al_2O_1$ | 30 wt % | 30 wt % | 30 wt % | 30 wt % | 30 wt % | 30 wt % | 30 wt % |
| Viscosity Brookfield with spindle #4 measured at 73° F. (room temperature) | | | | | | | |
| 0.5 RPM | 30,000 | 104,000 | 38,000 | 156,000 | 12,000 | 16,000 | 12,000 |
| 5 RPM | 8,800 | 22,200 | 10,800 | 29,200 | 5,000 | 7,400 | 4,400 |
| 20 RPM | 5,200 | 6,300 | | | 3,300 | 4,800 | 3,000 |
| Settling (the clear layer of liquid on top of the coating was measured in inches at 125° F.) more clear layer indicates more settling | | | | | | | |
| 16 hours | none | none | none | none | ⅛" | none | ⅛" |
| 24 hours | none | none | none | none | ⅛" | none | ⅛" |
| 64 hours | ⅛" | none | none | none | ¼" | none | 3/16" |
| 136 hours | ¼" | none | 1/16" | none | ½" | none | 9/16" |
| 160 hours | ¼" | none | 1/16" | none | ½" | none | ⅝" |

TABLE 18

| Properties | Fumed silica e.g., Aerosil R972 | Fumed silica e.g., Aerosil R974 | Fumed alumina, e.g., Aluminum oxide C |
|---|---|---|---|
| Average particle size | 16 | 12 | 13 |
| Surface area (sq. m/g) | 90–130 | 150–190 | 85–115 |
| Specific Gravity | 2.2 | 2.2 | 3.2 |
| pH of 4% slurry in water | 3.6–5.0 | 3.4–5.0 | 4.5–5.5 |

Example 14

Radiation curable urethane based acrylate was used and A1203 dispersed therein with 0.8% by wt. suspension aid (Anti-Terra-204). The coating was cured from 1100–1400 mJ/cm² in an inert atmosphere using medium pressure mercury lamps. Table 19 shows the results.

TABLE 19

Effect of aluminum oxide mixed into top coat of PVC Floor Covering

| Properties | 0% $Al_2O_3$ | 5% $Al_2O_3$ | 10% $Al_2O_3$ | 15% $Al_2O_3$ | 20% $Al_2O_3$ |
|---|---|---|---|---|---|
| Coating thickness (mil) | 1.4 | 1.4 | 1.5 | 1.4 | 1.4 |
| Mean gloss at 60° measured by Gloss meter | 77.9 | 60.4 | 56.0 | 49.0 | 46.4 |
| Initial wear through* (No. of cycles) | 60 | 75 | 100 | 100 | 125 |
| Final wear through (No. of cycles) | 130 | 225 | 350 | 400 | 500 |
| Stain resistance@ | 9.5 | 9.5 | 12 | 12 | 12 |

*The wear resistance is determined by the modified NEMA test as described before.
@The lower the number, the better the stain resistance. This reflects the stain resistance of the coating to different stains.

The following observations were made.
1. This example shows that by properly selecting the amount of aluminum oxide in the coating, the desired wear resistance can be achieved.
2. Addition of aluminum oxide into a high gloss coating decreases the gloss of the coating. However, the desired gloss level could be achieved by properly selecting the particle size and the concentration.
3. Depending on the amount and the particle size of aluminum oxide the slip resistance of the product could also be increased.
4. The preferred particle sizes are 15–300 microns, more preferably 20–200 microns.
5. In this example, fused aluminum oxide was used, basically any hard particles could be used.
6. The aluminum oxide can stay suspended in the coating from a week to 6 months at room temperature.

Example 15

In this example, the effects of just using a submicron particle, such as fumed silica or fumed alumina as the suspension aid was determined. In particular, in a mixture of urethane-based acrylate and either fumed or calcined aluminum oxide mixed at a speed of at about 660–700 m/min, the submicron material was added. The Degussa R972 fumed silica was added in an amount of about 1% by weight to the mixture containing fumed aluminum oxide and about 5% by weight fumed silica was added to the mixture containing the calcined aluminum oxide with the curable resin being a urethane based acrylate from Lord Corporation. After mixing, the formulations were studied for at least two days and after two days it was observed that the aluminum oxide wear resistant particles were still substantially suspended in the formulation thus showing the ability of the submicron particles to suspend the wear-resistant particles. The submicron particles, which act as suspension aids, had a significant increase in the viscosity of the formulation thus assisting in the suspension of the wear-resistant particles. A control was used which had no submicron particles present, but had aluminum oxide wear-resistant particles present and severe settling occurred in the first and second days of the study. The formulations were then cured by a 200/200 watt UV lamp to show that the formulations were usable as coatings.

Example 16

A urethane based acrylate coating was prepared using the amounts and specific ingredients set forth in Table 20. The formulation was then formed into a coating and cured using the procedures set forth in Example 7 and the various properties set forth in Table 18 were measured. As can be seen from the measured properties, the use of a suspension aid and wear-resistant particles had a substantial effect on coefficients of friction, thus showing a significantly improved slip-resistant product which could be used in surface coverings, especially floor coverings.

TABLE 20

Aluminum Oxide Combinations and Effect on Coefficients of Friction

| Ingredient | Formula Number | | | | | | | Control (no Al Oxide) |
| --- | --- | --- | --- | --- | --- | --- | --- | --- |
| | 1 | 2 | 3 | 4 | 5 | 6 | 7 | |
| Urethane (U312) | 147 | 147 | 147 | 147 | 147 | 147 | 147 | |
| BYK-088 | 1.3 | 1.3 | 1.3 | 1.3 | 1.3 | 1.3 | 1.3 | |
| Anti-Terra 204 | 2.4 | 2.4 | 2.4 | 2.4 | 2.4 | 2.4 | 2.4 | |
| Comp Mat 30 | 150 | 120 | 100 | 75 | 50 | 30 | 0 | |
| WCA 50 | 0 | 30 | 50 | 75 | 100 | 120 | 150 | |
| Coefficients of Friction | | | | | | | | |
| Leather | 0.59 | 0.67 | 0.65 | 0.62 | 0.69 | 0.60 | 0.68 | 0.48 |
| Wet Neolite | 0.24 | 0.23 | 0.24 | 0.24 | 0.25 | 0.24 | 0.29 | 0.18 |
| Viscosities Brookfield, cps | | | | | | | | |
| 20 RPM | 5700 | 8000 | 5400 | 6800 | 5500 | 6100 | 6900 | 1900 |
| 5 RPM | 12400 | 19800 | 10800 | 13600 | 10600 | 13600 | 15600 | 3200 |
| 0.5 RPM | 66000 | 114000 | 48000 | 72000 | 44000 | 72000 | 84000 | 12000 |

U-312 is a urethane coating provided by Lord. Corp.
Comp Mat 30 is an aluminum oxide provided by Composition Materials (180 Mesh).
WCA 50 is an aluminum oxide made by Microabrasives.

Example 17

Gloss contrast between grout chemically embossed against smooth raised tiles; the contrast effect is created by using the difference of gloss between UV curable PU coatings. The following observations were made:
1. Apply 10 mils of 2:1 to 4:1 blow ratio of foamable pregel on fibrous backing. Heat and gel the substrate.
2. Print the pre-determined design or pattern by Gravure cylinders using foamable inhibitor at selective areas of design.
3. Formulate a dull gloss resinous PVC plastisol wear layer by adding proper amount and type of flatting agent or other additives to have a gloss level around 15%–20% measured by 60 degree glossmeter.
4. Apply the dull gloss wear layer 5 mils to 30 mils on the printed, gelled substrate. Fuse the product at an elevated temperature such as 395° F. to 410° F. for 4.5 minutes to 2.5 minutes. At this stage, the reaction of foamable inhibitor and blowing agent in the pregel has created the pre-determined surface embossed texture. For instance, for the ceramic tile-printing pattern, the sheet will have 5 mils to 15 mils embossed texture as the grout line and very smooth or very subtle texture surface as ceramic blocks.
5. Apply the last top coat preferred to use UV curable PU about 0.5 mils–2.0 mils by differential direct roll coater or other equipment that can easily transfer the coating from the applicator of the coater to the non-embossed areas of the substrate coming to contact with the coater to form a discrete layer.
6. The gloss level of the last topcoat has to be sharply different from the gloss level of the continuous layer directly underneath to form the noticeable contrast effect.
7. Cure the last topcoat by UV radiation curing chamber.

Example 18

Gloss contrast between grout chemically embossed against smooth raised tiles; the contrast effect is created by using two different gloss UV curable PU coatings. The following observations were made:

1. Apply 10 mils to 30 mils of 2:1 to 4:1 blow ratio of foamable pregel on fibrous backing. Heat and gel the substrate.
2. Print the pre-determined design or pattern by Gravure cylinders using foamable inhibitor at selective areas of design.
3. Apply a resinous plastisol wear layer 5 mils on the printed, gelled substrate. Fuse the product at an elevated temperature such as 395° F. to 410° F. for 4.5 minutes to 2.5 minutes. At this stage, the reaction of foamable inhibitor and blowing agent in the pregel has created the pre-determined surface embossed texture. For instance, for the ceramic tile-printing pattern, the sheet will have 5 mils to 15 mils embossed texture as the grout line and very smooth or very subtle texture surface as ceramic blocks.

4. Apply the first UV curable PU topcoat, a dull gloss 15%–20% about 0.5 mils to 1.5 mils thickness, on the fused, blown sheet to form a continuous layer. Control proper curing energy to just semi-cure the first dull, UV top coat. Otherwise, it can run into an adhesion problem with the second higher gloss UV curable PU top coat applied on top of it.
5. Apply the second top coat preferred to use UV curable PU about 0.5 mils –2.0 mils by differential direct roll coater or other equipment that can easily transfer the coating from the applicator of the coater to the non-embossed areas of the substrate coming to contact with the coater to form a discrete layer.
6. The gloss level of the last top coat has to be sharply different from the gloss level of the continuous layer directly underneath to form the noticeable contrast effect.
7. Fully cure the first and the second top coat by UV radiation curing chamber.

Example 19

Gloss contrast plus grout texture contrast against smooth, raised tiles. The following observations were made:
1. Apply 10 mils to 30 mils of 2:1 to 4:1 blow ratio of foamable pregel on fibrous backing. Heat and gel the substrate.
2. Print the pre-determined design or pattern by Gravure cylinders using foamable inhibitor at selective areas of design.
3. Apply a resinous plastisol wear layer 5 mils to 30 mils on the printed, gelled substrate. Fuse the product at an elevated temperature such as 395° F. to 410° F. for 4.5 minutes to 2.5 minutes. At this stage, the reaction of foamable inhibitor and blowing agent in the pregel has created the pre-determined surface embossed texture. For instance, for the ceramic tile-printing pattern, the sheet will have 5 mils to 15 mils embossed texture as the grout line and very smooth or very subtle texture surface as ceramic blocks.
4. Heat the substrate and then mechanically emboss the entire surface with "sandpaper like" texture.
5. Expose the entire sheet to a moderate heat environment (250° F.–300° F.) for 20–30 seconds that cause the sandpaper like texture at non-retarded tiles to restore its smooth surface but retarded grout remains down with sandpaper texture.
6. Apply the last top coat preferred to use UV curable PU about 0.5 mils–2.0 mils by differential direct roll coater or other equipment that can easily transfer the coating from the applicator of the coater to the non-embossed areas of the substrate coming into contact with the coater to form a discrete layer.
7. The gloss level of the last top coat has to be sharply different from the gloss level of the continuous layer directly underneath to form the noticeable contrast effect.
8. Cure the last top coat by UV radiation curing chamber.

Other embodiments of the present invention will be apparent to those skilled in the art from consideration of the present specification and practice of the present invention disclosed herein. It is intended that the present specification and examples be considered as exemplary only with the true scope and spirit of the present invention being indicated by the following claims.

What is claimed is:

1. A surface covering comprising:

a backing layer;

a foam layer located on said backing layer;

a design layer located on said foam layer;

a continuous wear layer located on top of said design layer and wherein said continuous wear layer is mechanically embossed with a surface texture or design; and a non-continuous top coat layer located on said embossed wear layer.

2. The surface covering of claim 1, wherein a continuous top coat layer is located between the embossed wear layer and the non-continuous top coat layer.

3. The surface covering of claim 1, wherein said continuous top coat layer has wear resistant particles dispersed therein.

4. The surface covering of claim 1, wherein said continuous top coat layer comprises a cured urethane and said non-continuous top coat layer comprises a cured urethane.

5. The surface covering of claim 1, wherein said continuous top coat layer and non-continuous top coat layer both contain wear resistant particles dispersed in each layer.

6. The surface covering of claim 1, wherein the difference in gloss level between the non-continuous top coat layer and the continuous top coat layer is from about 15 to about 95 as measured by a 60° glossmeter.

7. The surface covering of claim 1, wherein the difference in gloss level between the non-continuous top coat layer and the continuous top coat layer is from about 35 to about 55 as measured by a 60° glossmeter.

8. The surface covering of claim 1, wherein the continuous top coat layer has a non-glossy appearance and the non-continuous top coat layer has a glossy appearance.

9. The surface covering of claim 1, wherein the continuous top coat layer has a glossy appearance and the non-continuous top coat layer has non-glossy appearance.

10. The surface covering of claim 1, wherein the surface texture of the continuous wear layer is mechanically embossed after first subjecting said wear layer to a sufficient temperature of soften said wear layer.

11. The surface covering of claim 1, wherein said continuous top coat layer comprises urethane.

12. The surface covering of claim 1, wherein said non-continuous top coat layer comprises urethane.

13. The surface covering of claim 1, wherein at least a portion of said design layer is chemically embossed.

14. The surface covering of claim 13, wherein said top coat layer overlies only the areas which have not been chemically embossed.

* * * * *

UNITED STATES PATENT AND TRADEMARK OFFICE
CERTIFICATE OF CORRECTION

PATENT NO. : 6,555,216 B2
DATED : April 29, 2003
INVENTOR(S) : Hao A. Chen et al.

It is certified that error appears in the above-identified patent and that said Letters Patent is hereby corrected as shown below:

<u>Title page,</u>
Item [73], Assignee, "Mannington Mill, Inc." should read
-- Mannington Mills, Inc. --.

<u>Column 32,</u>
Line 47, "of" should read -- to --.

Signed and Sealed this

Second Day of September, 2003

JAMES E. ROGAN
*Director of the United States Patent and Trademark Office*